United States Patent
Huang et al.

(10) Patent No.: US 12,495,006 B2
(45) Date of Patent: Dec. 9, 2025

(54) METHOD AND APPARATUS FOR DETERMINING BUFFER

(71) Applicant: HUAWEI TECHNOLOGIES CO., LTD., Shenzhen (CN)

(72) Inventors: Haining Huang, Beijing (CN); Chao Li, Beijing (CN); Shulan Feng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 321 days.

(21) Appl. No.: 17/987,667

(22) Filed: Nov. 15, 2022

(65) Prior Publication Data

US 2023/0088374 A1    Mar. 23, 2023

Related U.S. Application Data

(63) Continuation of application No. PCT/CN2021/093942, filed on May 14, 2021.

(30) Foreign Application Priority Data

May 15, 2020    (CN) .......................... 202010414856.9

(51) Int. Cl.
   *H04L 47/52*    (2022.01)
   *H04L 47/30*    (2022.01)
   (Continued)

(52) U.S. Cl.
   CPC .............. *H04L 47/52* (2013.01); *H04L 47/30* (2013.01); *H04L 47/626* (2013.01); *H04W 28/0268* (2013.01); *H04W 28/0278* (2013.01)

(58) Field of Classification Search
   CPC ....... H04L 47/52; H04L 47/30; H04L 47/626; H04L 1/0003; H04L 1/0002;
   (Continued)

(56) References Cited

U.S. PATENT DOCUMENTS

| | | | |
|---|---|---|---|
| 2017/0171780 A1* | 6/2017 | Bhattacharya | H04L 47/25 |
| 2020/0178216 A1* | 6/2020 | Huang | H04W 72/0473 |
| 2021/0211219 A1* | 7/2021 | Sarkis | H04L 1/0005 |

FOREIGN PATENT DOCUMENTS

| | | | | |
|---|---|---|---|---|
| WO | WO-2015103630 A1 * | 7/2015 | | H04L 1/0001 |
| WO | WO-2021181485 A1 * | 9/2021 | | H04W 28/0278 |

OTHER PUBLICATIONS

Machine translated English version of WO-2021181485-A1 retrieved from PE2E on Jan. 15, 2025 (Year: 2020).*
(Continued)

*Primary Examiner* — Joseph E Avellino
*Assistant Examiner* — Adam Joel Cerlanek
(74) *Attorney, Agent, or Firm* — Leydig, Voit & Mayer, Ltd.

(57) ABSTRACT

This application provides a buffer determining method and apparatus, to resolve a problem of how a terminal device on a sidelink calculates a buffer size. The method includes: A terminal device determines a sidelink data rate, and determines a buffer size based on the sidelink data rate. In this embodiment of this application, the terminal device may determine the buffer size based on the sidelink data rate, to calculate a buffer size of terminal device in sidelink communication.

20 Claims, 6 Drawing Sheets

S201
A terminal device determines a sidelink data rate

S202
The terminal device determines a buffer size based on the sidelink data rate

(51) Int. Cl.
*H04L 47/625* (2022.01)
*H04W 28/02* (2009.01)

(58) Field of Classification Search
CPC ......... H04W 28/0268; H04W 28/0278; H04W 28/22; H04W 28/16; H04B 7/1851; H04B 7/18558
See application file for complete search history.

(56) References Cited

OTHER PUBLICATIONS

3GPP TS 36.213 V16.1.0, Mar. 2020 (Year: 2020).*
Machine translated English version of WO-2021181485-A1 retrieved from PE2E on May 10, 2025 (Year: 2020).*
3GPP TS 38.306 V16.0.0, Mar. 2020 (Year: 2020).*
Samsung, "Corrections on DL/UL Resource Allocation," 3GPP TSG RAN WG1 Meeting #93, R1-1806737, Busan, Korea, pp. 1-3, 3rd Generation Partnership Project, Valbonne, France (May 21-25, 2018).
Huawei et al., "Discussion on the UE category in NR," 3GPP TSG RAN WG1 Meeting 91, R1-1719833, Reno, USA, Total 3 pages, 3rd Generation Partnership Project, Valbonne, France (Nov. 27-Dec. 1, 2017).
"3rd Generation Partnership Project; Technical Specification Group Radio Access Network; NR; User Equipment (UE) radio transmission and reception; Part 1: Range 1 Standalone (Release 16)," 3GPP TS 38.101-1 V16.3.0, pp. 1-332, 3rd Generation Partnership Project, Valbonne, France (Mar. 2020).
CATT, "Remaining issues on physical layer structure for NR sidelink," 3GPP TSG RAN WG1 #100, R1-2000520, e-Meeting, Total 15 pages, 3rd Generation Partnership Project, Valbonne, France (Feb. 24-Mar. 6, 2020).
"3rd Generation Partnership Project; Technical Specification Group Radio Access Network; NR; User Equipment (UE) radio transmission and reception; Part 2: Range 2 Standalone (Release 16)," 3GPP TS 38.101-2 V16.3.1, pp. 1-170, 3rd Generation Partnership Project, Valbonne, France (Mar. 2020).
OPPO, "Summary of [Post109e#20][V2X] Remaining UE capability issues (OPPO)," 3GPP TSG-RAN WG2 #109b-e, R2-2002638, E-meeting, pp. 1-17, 3rd Generation Partnership Project, Valbonne, France (Apr. 2020).
"3rd Generation Partnership Project; Technical Specification Group Radio Access Network; NR; Physical channels and modulation (Release 16)," 3GPP TS 38.211 V16.1.0, pp. 1-130, 3rd Generation Partnership Project, Valbonne, France (Mar. 2020).
"3rd Generation Partnership Project; Technical Specification Group Radio Access Network; NR; User Equipment (UE) radio access capabilities (Release 16)," 3GPP TS 38.306 V16.0.0, pp. 1-64, 3rd Generation Partnership Project, Valbonne, France (Mar. 2020).
Intel Corporation, "L2 buffer size capability," 3GPP TSG-RAN WG2 Meeting #100, R2-1712692, Reno, Nevada, USA, pp. 1-6, 3rd Generation Partnership Project, Valbonne, France (Nov. 27-Dec. 1, 2017).

* cited by examiner

| PRB Index | RE Index | Symbol 1 |
|---|---|---|
| PRB3 | 12 | +1 |
| | 11 | |
| | 10 | |
| | 9 | |
| | 8 | −1 |
| | 7 | |
| | 6 | |
| | 5 | |
| | 4 | +1 |
| | 3 | |
| | 2 | |
| | 1 | |
| PRB2 | 12 | −1 |
| | 11 | |
| | 10 | |
| | 9 | |
| | 8 | +1 |
| | 7 | |
| | 6 | |
| | 5 | |
| | 4 | −1 |
| | 3 | |
| | 2 | |
| | 1 | |
| PRB1 | 12 | +1 |
| | 11 | |
| | 10 | |
| | 9 | |
| | 8 | −1 |
| | 7 | |
| | 6 | |
| | 5 | |
| | 4 | +1 |
| | 3 | |
| | 2 | |
| | 1 | |

FIG. 6B

| PRB Index | RE Index | Symbol 1 |
|---|---|---|
| | 12 | +1 |
| | 11 | |
| | 10 | |
| | 9 | |
| | 8 | +1 |
| | 7 | |
| PRB3 | 6 | |
| | 5 | |
| | 4 | +1 |
| | 3 | |
| | 2 | |
| | 1 | |
| | 12 | +1 |
| | 11 | |
| | 10 | |
| | 9 | |
| | 8 | +1 |
| | 7 | |
| PRB2 | 6 | |
| | 5 | |
| | 4 | +1 |
| | 3 | |
| | 2 | |
| | 1 | |
| | 12 | +1 |
| | 11 | |
| | 10 | |
| | 9 | |
| | 8 | +1 |
| | 7 | |
| PRB1 | 6 | |
| | 5 | |
| | 4 | +1 |
| | 3 | |
| | 2 | |
| | 1 | |

FIG. 6C

METHOD AND APPARATUS FOR DETERMINING BUFFER

CROSS-REFERENCE TO RELATED APPLICATIONS

This application is a continuation of International Application No. PCT/CN2021/093942, filed on May 14, 2021, which claims priority to Chinese Patent Application No. 202010414856.9, filed on May 15, 2020. The disclosures of the aforementioned applications are incorporated herein by reference in their entireties.

TECHNICAL FIELD

This application relates to the field of communication technologies, and in particular, to a buffer determining method and apparatus.

BACKGROUND

Currently, a method for calculating a size of a layer 2 buffer (buffer) for cellular link transmission is defined in a communication protocol. The size of the layer 2 buffer may be understood as a sum of quantities of bytes (bytes) that can be stored by user equipment (user equipment, UE) in a radio link control (radio link control, RLC) transmitting window, an RLC receiving and reordering window, and a packet data convergence protocol (packet data convergence protocol, PDCP) reordering window on all radio bearers.

From the 3GPP Release 12, long term evolution (long term evolution, LTE) starts to support device-to-device communication in a cellular network, which is referred to as device to device (device to device, D2D) or sidelink communication (Sidelink Communication), for example, the Internet of vehicles (vehicle-to-everything, V2X). Currently, how a terminal device on a sidelink calculates a buffer becomes a problem urgently to be resolved.

SUMMARY

This application provides a buffer determining method and apparatus, to resolve a problem of how a terminal device on a sidelink calculates a buffer size.

According to a first aspect, an embodiment of this application provides a buffer determining method. The method includes: A terminal device determines a sidelink data rate, and determines a buffer size based on the sidelink data rate. In this embodiment of this application, the terminal device may determine the buffer size based on the sidelink data rate, to implement calculation of a layer 2 buffer of UE in sidelink communication, for example, V2X sidelink communication, new radio (new radio, NR) sidelink communication, and LTE sidelink communication. Therefore, reference can be provided for the terminal device to determine the buffer size, thereby further facilitating implementation performed by the terminal device.

In a possible design, when the terminal device determines the buffer size based on the sidelink data rate, the terminal device determines the buffer size based on the sidelink data rate and a sidelink round trip time. In the foregoing design, the terminal device can relatively accurately calculate the buffer size, to provide reference for the terminal device to determine the buffer size, thereby further facilitating implementation performed by the terminal device.

In a possible design, the sidelink data rate includes a sidelink transmit data rate and/or a sidelink receive data rate. In the foregoing design, the terminal device may calculate the buffer size based on the sidelink transmit data rate, or based on the sidelink receive data rate, or based on the sidelink transmit data rate and the sidelink receive data rate.

In a possible design, the sidelink data rate is a maximum value in the sidelink transmit data rate and the sidelink receive data rate. In the foregoing design, the terminal device may calculate the buffer size based on the maximum value in the sidelink transmit data rate and the sidelink receive data rate. Because the sidelink transmit data rate may be different from the sidelink receive data rate, a larger value is selected to determine a buffer size, so that the buffer size can be more accurately calculated. In this way, the determined buffer size can meet a sidelink communication requirement of the terminal device, thereby improving communication quality of the sidelink communication.

In a possible design, the sidelink transmit data rate is determined based on one or more of the following parameters: a quantity of transmit layers, a transmit modulation order number, and an overhead. The quantity of transmit layers is a maximum quantity of sidelink transmit layers supported by the terminal device. The transmit modulation order number is a maximum modulation order number supported by the terminal device for sidelink transmission. The overhead is a parameter value greater than 0 and not greater than 1. In the foregoing design, the terminal device can effectively determine the sidelink transmit data rate based on a sidelink communication capability, which is very beneficial to indicate an implementation operation performed by the terminal device.

In a possible design, the sidelink transmit data rate may meet the following formula:

$$SLTX \text{ Data Rate} = 10^{-6} \times \left( v_{Layers} \times Q_m \times f \times R_{max} \times \frac{N_{PRB}^{BW,\mu} \times 12}{T_S^{\mu}} \times (1 - OH) \right)$$

Herein, SLTXDataRate is the sidelink transmit data rate, $v_{Layers}$ is the quantity of transmit layers, $Q_m$ is the transmit modulation order number, f is an adjustment factor, $R_{max}$ is a maximum target bit rate, $T_s^{\mu}$ is an average symbol length in a slot, $N_{PRB}^{BW,\mu}$ is a maximum quantity of allocated resource blocks in a bandwidth, and OH is the overhead.

In a possible design, the sidelink receive data rate is determined based on one or more of the following parameters: a quantity of receive layers, a receive modulation order number, and an overhead. The quantity of receive layers is a maximum quantity of sidelink receive layers supported by the terminal device. The receive modulation order number is a maximum modulation order number supported by the terminal device for sidelink reception. The overhead is a parameter value greater than 0 and not greater than 1. In the foregoing design, the terminal device can effectively determine the sidelink receive data rate based on a sidelink communication capability, which is very beneficial to indicate an implementation operation performed by the terminal device.

In a possible design, the sidelink receive data rate meets the following formula:

$$SLTX \text{ Data Rate} = 10^{-6} \times \left( v_{Layers} \times Q_m \times f \times R_{max} \times \frac{N_{PRB}^{BW,\mu} \times 12}{T_S^{\mu}} \times (1 - OH) \right)$$

Herein, SLRXDataRate is the sidelink receive data rate, $v_{Layers}$ is the quantity of receive layers, $Q_m$ is the receive modulation order number, f is an adjustment factor, $R_{max}$ is a maximum target bit rate, $T_s^{\mu}$ is an average symbol length in a slot, $N_{PRB}^{BW,\mu}$ is a maximum quantity of allocated resource blocks in a bandwidth, and OH is the overhead.

In a possible design, the overhead has at least one of the following correspondences: a correspondence between the overhead and a physical sidelink feedback channel (physical sidelink feedback channel, PSFCH) resource period, a correspondence between the overhead and a PSFCH, a correspondence between the overhead and a cyclic prefix (cyclic prefix, CP) type, and a correspondence between the overhead and a frequency range. In the foregoing design, different overhead values may be used in different application scenarios, to improve accuracy of calculating the buffer size. In addition, in the foregoing design, flexibility of determining a buffer by the terminal device can be further improved, and unnecessary costs and overheads can be avoided, to achieve a purpose of reducing the costs.

In a possible design, the correspondence between the overhead and the PSFCH resource period may be as follows:

If the PSFCH resource period is 0, the OH may be 0.28.
If the PSFCH resource period is 1, the OH may be 0.49.
If the PSFCH resource period is 2, the OH may be 0.38.
If the PSFCH resource period is 4, the OH may be 0.33.

In a possible design, a correspondence between the overhead and each of the PSFCH resource period and the CP type may be as follows:

If the CP type is an NCP, and the PSFCH resource period is 0, the OH may be 0.28.
If the CP type is an NCP, and the PSFCH resource period is 1, the OH may be 0.49.
If the CP type is an NCP, and the PSFCH resource period is 2, the OH may be 0.38.
If the CP type is an NCP, and the PSFCH resource period is 4, the OH may be 0.33.
If the CP type is an ECP, and the PSFCH resource period is 0, the OH may be 0.32.
If the CP type is an ECP, and the PSFCH resource period is 1, the OH may be 0.57.
If the CP type is an ECP, and the PSFCH resource period is 2, the OH may be 0.45.
If the CP type is an ECP, and the PSFCH resource period is 4, the OH may be 0.39.

In a possible design, the correspondence between the overhead and the frequency range may be as follows: If the frequency range is FR1, the OH is 0.277. If the frequency range is FR2, the OH is 0.278.

In a possible design, the correspondence between the overhead and the frequency range may be as follows: If the frequency range is FR1, the OH is 0.323. If the frequency range is FR2, the OH is 0.324.

In a possible design, a correspondence between the overhead and each of the PSFCH resource period, the frequency range, and the CP type may be as follows:

If the frequency range is FR1, the CP type is an NCP, and the PSFCH resource period is 0, the overhead is 0.2771.
If the frequency range is FR1, the CP type is an NCP, and the PSFCH resource period is 1, the overhead is 0.4914.
If the frequency range is FR1, the CP type is an NCP, and the PSFCH resource period is 2, the overhead is 0.3843.
If the frequency range is FR1, the CP type is an NCP, and the PSFCH resource period is 4, the overhead is 0.3307.
If the frequency range is FR1, the CP type is an ECP, and the PSFCH resource period is 0, the overhead is 0.3233.
If the frequency range is FR1, the CP type is an ECP, and the PSFCH resource period is 1, the overhead is 0.5733.
If the frequency range is FR1, the CP type is an ECP, and the PSFCH resource period is 2, the overhead is 0.4483.
If the frequency range is FR1, the CP type is an ECP, and the PSFCH resource period is 4, the overhead is 0.3858.
If the frequency range is FR2, the CP type is an NCP, and the PSFCH resource period is 0, the overhead is 0.2779.
If the frequency range is FR2, the CP type is an NCP, and the PSFCH resource period is 1, the overhead is 0.4921.
If the frequency range is FR2, the CP type is an NCP, and the PSFCH resource period is 2, the overhead is 0.3850.
If the frequency range is FR2, the CP type is an NCP, and the PSFCH resource period is 4, the overhead is 0.3314.
If the frequency range is FR2, the CP type is an ECP, and the PSFCH resource period is 0, the overhead is 0.3242.
If the frequency range is FR2, the CP type is an ECP, and the PSFCH resource period is 1, the overhead is 0.5742.
If the frequency range is FR2, the CP type is an ECP, and the PSFCH resource period is 2, the overhead is 0.4492.
If the frequency range is FR2, the CP type is an ECP, and the PSFCH resource period is 4, the overhead is 0.3867.

In a possible design, the buffer size may meet the following formula:

Buffer Size=SLTXDataRate×SL RTT+SLRXDataRate×SL RTT

Herein, Buffer Size is the buffer size, SLTXDataRate is the sidelink transmit data rate, SLRXDataRate is the sidelink receive data rate, and SL RTT is the sidelink round trip time.

In a possible design, the buffer size meets the following formula:

Buffer Size=SLDataRate×SL RTT

Herein, Buffer Size is the buffer size; SLDataRate is the maximum value in the sidelink transmit data rate and the sidelink receive data rate, or SLDataRate is the sidelink receive data rate, or SLDataRate is the sidelink transmit data rate; and SL RTT is the sidelink round trip time.

In a possible design, there is a correspondence between the sidelink round trip time and subcarrier spacing of a sidelink frequency band. In the foregoing design, different communication scenarios correspond to different sidelink round trip times, to improve accuracy of calculating the buffer size and further provide indicative reference for the terminal device to determine the buffer size.

In a possible design, the sidelink round trip time is determined based on a first list. The first list includes a round trip time corresponding to subcarrier spacing of at least one sidelink frequency band.

In a possible design, the sidelink round trip time is a sum of a time length of RLC polling and n times a maximum value of a hybrid automatic repeat request (hybrid automatic repeat request, HARQ) round trip time, where n is an integer greater than 0; or the sidelink round trip time is a sum of a time length of RLC polling and n times a minimum value of a HARQ round trip time, where n is an integer greater than 0; or the sidelink round trip time is an average value of a first value and a second value, where the first value is a sum of a time length of RLC polling and n times a maximum value of a HARQ round trip time, the second value is a sum of the time length of the RLC polling and n times a minimum value of the HARQ round trip time, and n is an integer greater than 0.

In a possible design, the first list may include the following:
If the SCS is 15 kHz, the sidelink round trip time is 50 ms.
If the SCS is 30 kHz, the sidelink round trip time is 40 ms.
If the SCS is 60 kHz, the sidelink round trip time is 30 ms.
If the SCS is 120 kHz, the sidelink round trip time is 20 ms.

In a possible design, the first list may alternatively include the following:
If the SCS is 15 kHz, the sidelink round trip time is 187 ms.
If the SCS is 30 kHz, the sidelink round trip time is 94 ms.
If the SCS is 60 kHz, the sidelink round trip time is 47 ms.
If the SCS is 120 kHz, the sidelink round trip time is 23 ms.

In a possible design, the first list may alternatively include the following:
If the SCS is 15 kHz, the sidelink round trip time is 37 ms.
If the SCS is 30 kHz, the sidelink round trip time is 19 ms.
If the SCS is 60 kHz, the sidelink round trip time is 9 ms.
If the SCS is 120 kHz, the sidelink round trip time is 5 ms.

In a possible design, the first list may alternatively include the following:
If the SCS is 15 kHz, the sidelink round trip time is 112 ms.
If the SCS is 30 kHz, the sidelink round trip time is 56 ms.
If the SCS is 60 kHz, the sidelink round trip time is 28 ms.
If the SCS is 120 kHz, the sidelink round trip time is 14 ms.

In a possible design, the first list may alternatively include the following:
If the SCS is 15 kHz, the sidelink round trip time is 186 ms.
If the SCS is 30 kHz, the sidelink round trip time is 93 ms.
If the SCS is 60 kHz, the sidelink round trip time is 47 ms.
If the SCS is 120 kHz, the sidelink round trip time is 23 ms.

In a possible design, the first list may alternatively include the following:
If the SCS is 15 kHz, the sidelink round trip time is 6 ms.
If the SCS is 30 kHz, the sidelink round trip time is 3 ms.
If the SCS is 60 kHz, the sidelink round trip time is 2 ms.
If the SCS is 120 kHz, the sidelink round trip time is 1 ms.

In a possible design, the first list may alternatively include the following:
If the SCS is 15 kHz, the sidelink round trip time is 96 ms.
If the SCS is 30 kHz, the sidelink round trip time is 48 ms.
If the SCS is 60 kHz, the sidelink round trip time is 24 ms.
If the SCS is 120 kHz, the sidelink round trip time is 12 ms.

In a possible design, the terminal device may further determine a downlink data rate and an uplink data rate. When determining the buffer size based on the sidelink data rate, the terminal device may determine the buffer size based on the sidelink data rate, the downlink data rate, and the uplink data rate. In the foregoing design, the buffer size can be calculated in a case of an SL and Uu frequency band combination.

In a possible design, when the terminal device determines the buffer size based on the sidelink data rate, the downlink data rate, and the uplink data rate, the terminal device may determine the buffer size based on the sidelink data rate, the downlink data rate, the uplink data rate, the sidelink round trip time, and a cellular link round trip time. The cellular link round trip time is an RLC layer round trip time in cellular link communication. In the foregoing design, the terminal device can relatively accurately calculate the buffer size, to provide indicative reference for the terminal device to determine the buffer size.

In a possible design, the buffer size may meet the following formula:

Buffer Size=MaxDLDataRate×RLC RTT+MaxUL-DataRate×RLC RTT+SLTXDataRate×SL RTT+SLRXDataRate×SL RTT Herein, Buffer Size is the buffer size, MaxULDataRate is the uplink data rate, MaxDLDataRate is the downlink data rate, RLC RTT is the cellular link round trip time, SLTXDataRate is the sidelink transmit data rate, SLRXDataRate is the sidelink receive data rate, and SL RTT is the sidelink round trip time.

In a possible design, the buffer size meets the following formula:

Buffer Size=MaxDLDataRate×RLC RTT+MaxUL-DataRate×RLC RTT+SLDataRate×SL RTT

Herein, Buffer Size is the buffer size; MaxULDataRate is the uplink data rate; MaxDLDataRate is the downlink data rate; RLC RTT is the cellular link round trip time; SLDataRate is the maximum value in the sidelink transmit data rate and the sidelink receive data rate, SLDataRate is the sidelink receive data rate, or SLDataRate is the sidelink transmit data rate; and SL RTT is the sidelink round trip time.

In a possible design, the terminal device may further determine whether a physical sidelink shared channel (physical sidelink shared channel, PSSCH) meets a preset condition. The preset condition is related to the sidelink round trip time. If the PSSCH meets the preset condition, the terminal device processes the PSSCH. If the PSSCH does not meet the preset condition, the terminal device may not process the PSSCH.

In a possible design, the preset condition may be as follows:

$$\frac{V_j}{L \times T_S^\mu} \leq SL \text{ Data Rate}$$

Herein, L is a quantity of symbols allocated for the PSSCH;

$$T_S^\mu = \frac{10^{-3}}{2^\mu \times N_{symb}^{slot}};$$

μ is a granularity of the PSSCH, or a granularity of a corresponding frequency band/serving cell/partial bandwidth/resource pool;

$$V_j = C' \times \left|\frac{A}{C}\right|;$$

A is a quantity of bits in a transport block; C is a total quantity of code blocks in the transport block; and C' is a quantity of scheduled code blocks in the transport block.

In a possible design, the preset condition may be as follows:

$$\frac{TBS}{L \times T_S^\mu} \leq SL \text{ Data Rate}$$

Herein, L is a quantity of symbols allocated for the PSSCH;

$$T_S^\mu = \frac{10^{-3}}{2^\mu \times N_{symb}^{slot}};$$

µ is a granularity of the PSSCH, or a granularity of a corresponding frequency band/serving cell/partial bandwidth/resource pool; and TBS is a size of the transport block.

According to a second aspect, an embodiment of this application provides a buffer determining method. The method includes: A terminal device determines a sidelink data rate, a downlink data rate, and an uplink data rate, and determines a buffer size based on the sidelink data rate, the downlink data rate, and the uplink data rate. This embodiment of this application is applicable to a scenario of a frequency band and/or a frequency band combination, especially for an SL and Uu frequency band combination. The terminal device may determine the buffer size based on the sidelink data rate, the uplink data rate, and the downlink data rate, to implement calculation of a layer 2 buffer of UE in sidelink communication, for example, V2X sidelink communication, NR sidelink communication, and LTE sidelink communication. Therefore, reference can be provided for the terminal device to determine the buffer size, thereby further facilitating implementation performed by the terminal device.

In a possible design, when the terminal device determines the buffer size based on the sidelink data rate, the downlink data rate, and the uplink data rate, the terminal device may determine the buffer size based on the sidelink data rate, the downlink data rate, the uplink data rate, a sidelink round trip time, and a cellular link round trip time. The cellular link round trip time is an RLC layer round trip time in cellular link communication. In the foregoing design, the terminal device can relatively accurately calculate the buffer size, to provide reference for the terminal device to determine the buffer size, thereby further facilitating implementation performed by the terminal device.

In a possible design, the sidelink data rate includes a sidelink transmit data rate and/or a sidelink receive data rate. In the foregoing design, the terminal device may calculate the buffer size based on the sidelink transmit data rate, or based on the sidelink receive data rate, or based on the sidelink transmit data rate and the sidelink receive data rate.

In a possible design, the sidelink data rate is a maximum value in the sidelink transmit data rate and the sidelink receive data rate. In the foregoing design, the terminal device may further calculate the buffer size based on the maximum value in the sidelink transmit data rate and the sidelink receive data rate. Because the sidelink transmit data rate may be different from the sidelink receive data rate, a larger value is selected to determine the buffer size, so that the buffer size can be more accurately calculated. In this way, the determined buffer size can meet a sidelink communication requirement of the terminal device, thereby improving communication quality of the sidelink communication.

In a possible design, the sidelink transmit data rate is determined based on a quantity of transmit layers, a transmit modulation order number, and an overhead. The quantity of transmit layers is a maximum quantity of sidelink transmit layers supported by the terminal device. The transmit modulation order number is a maximum modulation order number supported by the terminal device for sidelink transmission. The overhead is a parameter value greater than 0 and not greater than 1. In the foregoing design, the terminal device can effectively determine the sidelink transmit data rate based on a sidelink communication capability, which is very beneficial to indicate an implementation operation performed by the terminal device.

In a possible design, the sidelink transmit data rate meets the following formula:

$$SLTXDataRate = 10^{-6} \times \left( v_{Layers} \times Q_m \times f \times R_{max} \times \frac{N_{PRB}^{BW,\mu} \times 12}{T_s^\mu} \times (1 - OH) \right)$$

Herein, SLTXDataRate is the sidelink transmit data rate, $v_{Layers}$ is the quantity of transmit layers, $Q_m$ is the transmit modulation order number, f is an adjustment factor, $R_{max}$ is a maximum target bit rate, $T_s^\mu$ is an average symbol length in a slot, $N_{PRB}^{BW,\mu}$ is a maximum quantity of allocated resource blocks in a bandwidth, and OH is the overhead.

In a possible design, the sidelink receive data rate is determined based on a quantity of receive layers, a receive modulation order number, and an overhead. The quantity of receive layers is a maximum quantity of sidelink receive layers supported by the terminal device. The receive modulation order number is a maximum modulation order number supported by the terminal device for sidelink reception. The overhead is a parameter value greater than 0 and not greater than 1. In the foregoing design, the terminal device may effectively determine the sidelink receive data rate based on a sidelink communication capability, which is very beneficial to indicate an implementation operation performed by the terminal device.

In a possible design, the sidelink receive data rate meets the following formula:

$$SLRXDataRate = 10^{-6} \times \left( v_{Layers} \times Q_m \times f \times R_{max} \times \frac{N_{PRB}^{BW,\mu} \times 12}{T_s^\mu} \times (1 - OH) \right)$$

Herein, SLRXDataRate is the sidelink receive data rate, $v_{Layers}$ is the quantity of receive layers, $Q_m$ is the receive modulation order number, f is an adjustment factor, $R_{max}$ is a maximum target bit rate, $T_s^\mu$ is an average symbol length in a slot, $N_{PRB}^{BW,\mu}$ is a maximum quantity of allocated resource blocks in a bandwidth, and OH is the overhead.

In a possible design, the overhead has at least one of the following correspondences: a correspondence between the overhead and a PSFCH resource period, a correspondence between the overhead and a PSFCH, a correspondence between the overhead and a CP type, and a correspondence between the overhead and a frequency range. In the foregoing design, different overhead values may be used in different application scenarios, to improve accuracy of calculating the buffer size. In addition, in the foregoing design, flexibility of determining a buffer by the terminal device can be further improved, and unnecessary costs and overheads can be avoided, to achieve a purpose of reducing the costs.

In a possible design, the correspondence between the overhead and the PSFCH resource period may be as follows:
If the PSFCH resource period is 0, the OH may be 0.28.
If the PSFCH resource period is 1, the OH may be 0.49.
If the PSFCH resource period is 2, the OH may be 0.38.
If the PSFCH resource period is 4, the OH may be 0.33.

In a possible design, a correspondence between the overhead and each of the PSFCH resource period and the CP type may be as follows:
If the CP type is an NCP, and the PSFCH resource period is 0, the OH may be 0.28.
If the CP type is an NCP, and the PSFCH resource period is 1, the OH may be 0.49.
If the CP type is an NCP, and the PSFCH resource period is 2, the OH may be 0.38.
If the CP type is an NCP, and the PSFCH resource period is 4, the OH may be 0.33.
If the CP type is an ECP, and the PSFCH resource period is 0, the OH may be 0.32.
If the CP type is an ECP, and the PSFCH resource period is 1, the OH may be 0.57.
If the CP type is an ECP, and the PSFCH resource period is 2, the OH may be 0.45.
If the CP type is an ECP, and the PSFCH resource period is 4, the OH may be 0.39.

In a possible design, the correspondence between the overhead and the frequency range may be as follows: If the frequency range is FR1, the OH is 0.277. If the frequency range is FR2, the OH is 0.278.

In a possible design, the correspondence between the overhead and the frequency range may be as follows: If the frequency range is FR1, the OH is 0.323. If the frequency range is FR2, the OH is 0.324.

In a possible design, a correspondence between the overhead and each of the PSFCH resource period, the frequency range, and the CP type may be as follows:
If the frequency range is FR1, the CP type is an NCP, and the PSFCH resource period is 0, the overhead is 0.2771.
If the frequency range is FR1, the CP type is an NCP, and the PSFCH resource period is 1, the overhead is 0.4914.
If the frequency range is FR1, the CP type is an NCP, and the PSFCH resource period is 2, the overhead is 0.3843.
If the frequency range is FR1, the CP type is an NCP, and the PSFCH resource period is 4, the overhead is 0.3307.
If the frequency range is FR1, the CP type is an ECP, and the PSFCH resource period is 0, the overhead is 0.3233.
If the frequency range is FR1, the CP type is an ECP, and the PSFCH resource period is 1, the overhead is 0.5733.
If the frequency range is FR1, the CP type is an ECP, and the PSFCH resource period is 2, the overhead is 0.4483.
If the frequency range is FR1, the CP type is an ECP, and the PSFCH resource period is 4, the overhead is 0.3858.
If the frequency range is FR2, the CP type is an NCP, and the PSFCH resource period is 0, the overhead is 0.2779.
If the frequency range is FR2, the CP type is an NCP, and the PSFCH resource period is 1, the overhead is 0.4921.
If the frequency range is FR2, the CP type is an NCP, and the PSFCH resource period is 2, the overhead is 0.3850.
If the frequency range is FR2, the CP type is an NCP, and the PSFCH resource period is 4, the overhead is 0.3314.
If the frequency range is FR2, the CP type is an ECP, and the PSFCH resource period is 0, the overhead is 0.3242.
If the frequency range is FR2, the CP type is an ECP, and the PSFCH resource period is 1, the overhead is 0.5742.
If the frequency range is FR2, the CP type is an ECP, and the PSFCH resource period is 2, the overhead is 0.4492.
If the frequency range is FR2, the CP type is an ECP, and the PSFCH resource period is 4, the overhead is 0.3867.

In a possible design, the buffer size may meet the following formula:

Buffer Size=MaxDLDataRate×RLC RTT+MaxUL-DataRate×RLC RTT+SLTXDataRate×SL RTT+SLRXDataRate×SL RTT Herein, Buffer Size is the buffer size, MaxULDataRate is the uplink data rate, MaxDLDataRate is the downlink data rate, RLC RTT is the cellular link round trip time, SLTXDataRate is the sidelink transmit data rate, SLRXDataRate is the sidelink receive data rate, and SL RTT is the sidelink round trip time.

In a possible design, the buffer size meets the following formula:

Buffer Size=MaxDLDataRate×RLC RTT+MaxUL-DataRate×RLC RTT+SLDataRate×SL RTT

Herein, Buffer Size is the buffer size; MaxULDataRate is the uplink data rate; MaxDLDataRate is the downlink data rate; RLC RTT is the cellular link round trip time; SLDataRate is the maximum value in the sidelink transmit data rate and the sidelink receive data rate, SLDataRate is the sidelink receive data rate, or SLDataRate is the sidelink transmit data rate; and SL RTT is the sidelink round trip time.

In a possible design, there is a correspondence between the sidelink round trip time and subcarrier spacing. In the foregoing design, different application scenarios correspond to different sidelink round trip times, to improve accuracy of calculating the buffer size.

In a possible design, the sidelink round trip time is determined based on a first list. The first list includes a round trip time corresponding to at least one subscriber spacing.

In a possible design, the sidelink round trip time is a sum of a time length of RLC polling and n times a maximum value of a HARQ round trip time, where n is an integer greater than 0; or the sidelink round trip time is a sum of a time length of RLC polling and n times a minimum value of a HARQ round trip time, where n is an integer greater than 0; or the sidelink round trip time is an average value of a first value and a second value, where the first value is a sum of a time length of RLC polling and n times a maximum value of a HARQ round trip time, the second value is a sum of the time length of the RLC polling and n times a minimum value of the HARQ round trip time, and n is an integer greater than 0.

In a possible design, the first list may include the following:
If the SCS is 15 kHz, the sidelink round trip time is 50 ms.
If the SCS is 30 kHz, the sidelink round trip time is 40 ms.
If the SCS is 60 kHz, the sidelink round trip time is 30 ms.
If the SCS is 120 kHz, the sidelink round trip time is 20 ms.

In a possible design, the first list may alternatively include the following:
If the SCS is 15 kHz, the sidelink round trip time is 187 ms.
If the SCS is 30 kHz, the sidelink round trip time is 94 ms.
If the SCS is 60 kHz, the sidelink round trip time is 47 ms.
If the SCS is 120 kHz, the sidelink round trip time is 23 ms.

In a possible design, the first list may alternatively include the following:
If the SCS is 15 kHz, the sidelink round trip time is 37 ms.
If the SCS is 30 kHz, the sidelink round trip time is 19 ms.

If the SCS is 60 kHz, the sidelink round trip time is 9 ms.
If the SCS is 120 kHz, the sidelink round trip time is 5 ms.

In a possible design, the first list may alternatively include the following:

If the SCS is 15 kHz, the sidelink round trip time is 112 ms.
If the SCS is 30 kHz, the sidelink round trip time is 56 ms.
If the SCS is 60 kHz, the sidelink round trip time is 28 ms.
If the SCS is 120 kHz, the sidelink round trip time is 14 ms.

In a possible design, the first list may alternatively include the following:

If the SCS is 15 kHz, the sidelink round trip time is 186 ms.
If the SCS is 30 kHz, the sidelink round trip time is 93 ms.
If the SCS is 60 kHz, the sidelink round trip time is 47 ms.
If the SCS is 120 kHz, the sidelink round trip time is 23 ms.

In a possible design, the first list may alternatively include the following:

If the SCS is 15 kHz, the sidelink round trip time is 6 ms.
If the SCS is 30 kHz, the sidelink round trip time is 3 ms.
If the SCS is 60 kHz, the sidelink round trip time is 2 ms.
If the SCS is 120 kHz, the sidelink round trip time is 1 ms.

In a possible design, the first list may alternatively include the following:

If the SCS is 15 kHz, the sidelink round trip time is 96 ms.
If the SCS is 30 kHz, the sidelink round trip time is 48 ms.
If the SCS is 60 kHz, the sidelink round trip time is 24 ms.
If the SCS is 120 kHz, the sidelink round trip time is 12 ms.

In a possible design, the terminal device may further determine whether a PSSCH meets a preset condition. The preset condition is related to the sidelink round trip time. If the PSSCH meets the preset condition, the terminal device processes the PSSCH. If the PSSCH does not meet the preset condition, the terminal device may not process the PSSCH.

In a possible design, the preset condition may be as follows:

$$\frac{V_j}{L \times T_s^\mu} \le SLDataRate$$

Herein, L is a quantity of symbols allocated for the PSSCH;

$$T_s^\mu = \frac{10^{-3}}{2^\mu \times N_{symb}^{slot}};$$

μ is a granularity of the PSSCH, or a granularity of a corresponding frequency band/serving cell/partial bandwidth/resource pool;

$$V_j = C' \times \left\lceil \frac{A}{C} \right\rceil;$$

A is a quantity of bits in a transport block; C is a total quantity of code blocks in the transport block; and C' is a quantity of scheduled code blocks in the transport block.

In a possible design, the preset condition may be as follows:

$$\frac{TBS}{L \times T_s^\mu} \le SLDataRate$$

Herein, L is a quantity of symbols allocated for the PSSCH;

$$T_s^\mu = \frac{10^{-3}}{2^\mu \times N_{symb}^{slot}};$$

μ is a granularity of the PSSCH, or a granularity of a corresponding frequency band/serving cell/partial bandwidth/resource pool; and TBS is a size of the transport block.

According to a third aspect, this application provides a buffer determining apparatus. The apparatus may be a terminal device, or may be a chip or a chip group in a terminal device. The apparatus may include a processing unit and a transceiver unit. When the apparatus is the terminal device, the processing unit may be a processor, and the transceiver unit may be a transceiver. The apparatus may further include a storage unit. The storage unit may be a memory. The storage unit is configured to store instructions. The processing unit executes the instructions stored in the storage unit, so that the terminal device performs corresponding functions in the first aspect. When the apparatus is the chip or the chip group in the terminal device, the processing unit may be a processor, and the transceiver unit may be an input/output interface, a pin, a circuit, or the like. The processing unit executes instructions stored in a storage unit, so that the terminal device performs corresponding functions in the first aspect. The storage unit may be a storage unit (such as a register or a cache) in the chip or the chip group, or may be a storage unit (such as a read-only memory or a random access memory) outside the chip or the chip group in the communication device.

According to a fourth aspect, this application provides a buffer determining apparatus. The apparatus may be a terminal device, or may be a chip or a chip group in a terminal device. The apparatus may include a processing unit and a transceiver unit. When the apparatus is the terminal device, the processing unit may be a processor, and the transceiver unit may be a transceiver. The apparatus may further include a storage unit. The storage unit may be a memory. The storage unit is configured to store instructions. The processing unit executes the instructions stored in the storage unit, so that the terminal device performs corresponding functions in the second aspect. When the apparatus is the chip or the chip group in the terminal device, the processing unit may be a processor, and the transceiver unit may be an input/output interface, a pin, a circuit, or the like. The processing unit executes instructions stored in a storage unit, so that the terminal device performs corresponding functions in the second aspect. The storage unit may be a storage unit (such as a register or a cache) in the chip or the chip group, or may be a storage unit (such as a read-only memory or a random access memory) outside the chip or the chip group in the communication device.

According to a fifth aspect, an apparatus is provided, including: a processor, a communication interface, and a memory. The communication interface is configured to transmit information, messages, and/or data between the apparatus and another apparatus. The memory is configured to store computer-executable instructions. When the apparatus is run, the processor executes the computer-executable instructions stored in the memory, so that the apparatus performs the method according to the first aspect.

According to a sixth aspect, an apparatus is provided, including: a processor, a communication interface, and a memory. The communication interface is configured to transmit information, messages, and/or data between the apparatus and another apparatus. The memory is configured to store computer-executable instructions. When the apparatus is run, the processor executes the computer-executable instructions stored in the memory, so that the apparatus performs the method according to the second aspect.

According to a seventh aspect, this application further provides a communication system. The system includes a first terminal device and a second terminal device. At least one of the first terminal device and the second terminal device can perform corresponding functions in the second aspect.

Optionally, the communication system further includes a network device. The network device is communicatively connected to the first terminal device and/or the second terminal device.

According to an eighth aspect, this application further provides a communication system. The system includes a third terminal device and a fourth terminal device. At least one of the third terminal device and the fourth terminal device can perform corresponding functions in the second aspect.

Optionally, the communication system further includes a network device. The network device is communicatively connected to the third terminal device and/or the fourth terminal device.

According to a ninth aspect, this application further provides a computer-readable storage medium. The computer-readable storage medium stores instructions. When the computer-readable storage medium is run on a computer, the computer is enabled to perform the method in the first aspect, the second aspect, or an eleventh aspect.

According to a tenth aspect, this application further provides a computer program product including instructions. When the computer program product is run on a computer, the computer is enabled to perform the method in the first aspect, the second aspect, or an eleventh aspect.

According to an eleventh aspect, this application further provides a reference signal sending method. The method includes: A terminal device determines N resource blocks RBs of symbols. Herein, N is an odd number. A reference signal DMRS of a control channel is mapped on N−1 RBs by using an orthogonal code with a length of 2. A DMRS of a control channel or a DMRS of a data channel is mapped on the remaining RB in the following manner: mapping the DMRS of the control channel by using an orthogonal code with a length of 2, mapping the DMRS of the control channel by using an orthogonal code with a length of 3, or mapping the DMRS of the data channel. The terminal device sends the DMRS on the symbols. In the foregoing method, an orthogonality effect of an orthogonal cover code can be ensured, to minimize interference between different users, improve reliability of data transmission, improve quality of communication transmission, improve a channel estimation effect, and improve resource utilization.

In a possible design, mapping the reference signal DMRS of the control channel on the N−1 RBs includes: mapping the reference signal DMRS of the control channel on a first RB to an $(N-1)^{th}$ RB; or mapping the reference signal DMRS of the control channel on a second RB to an $N^{th}$ RB.

In a possible design, each of the N−1 RBs on which the DMRS of the control channel is mapped has three resource elements REs used to carry the DMRS of the control channel.

In a possible design, each two adjacent RBs of the N−1 RBs on which the DMRS of the control channel is mapped have six REs used to carry the DMRS of the control channel. The six REs are generated based on three orthogonal codes with a length of 2.

In a possible design, sequence values of the orthogonal cover code with a length of 2 are 1 and 1, or 1 and −1.

According to a twelfth aspect, this application provides a reference signal sending apparatus. The apparatus may be a terminal device, or may be a chip or a chip group in a terminal device. The apparatus may include a processing unit and a transceiver unit. When the apparatus is the terminal device, the processing unit may be a processor, and the transceiver unit may be a transceiver. The apparatus may further include a storage unit. The storage unit may be a memory. The storage unit is configured to store instructions. The processing unit executes the instructions stored in the storage unit, so that the terminal device performs corresponding functions in the eleventh aspect. When the apparatus is the chip or the chip group in the terminal device, the processing unit may be a processor, and the transceiver unit may be an input/output interface, a pin, a circuit, or the like. The processing unit executes instructions stored in a storage unit, so that the terminal device performs corresponding functions in the eleventh aspect. The storage unit may be a storage unit (such as a register or a cache) in the chip or the chip group, or may be a storage unit (such as a read-only memory or a random access memory) outside the chip or the chip group in the communication device.

According to a thirteenth aspect, an apparatus is provided, including: a processor, a communication interface, and a memory. The communication interface is configured to transmit information, messages, and/or data between the apparatus and another apparatus. The memory is configured to store computer-executable instructions. When the apparatus is run, the processor executes the computer-executable instructions stored in the memory, so that the apparatus performs the method according to the eleventh aspect.

BRIEF DESCRIPTION OF DRAWINGS

FIG. 6B is a schematic diagram of a reference signal according to an embodiment of this application;

FIG. 6C is a schematic diagram of another reference signal according to an embodiment of this application;

DESCRIPTION OF EMBODIMENTS

Figure 1:
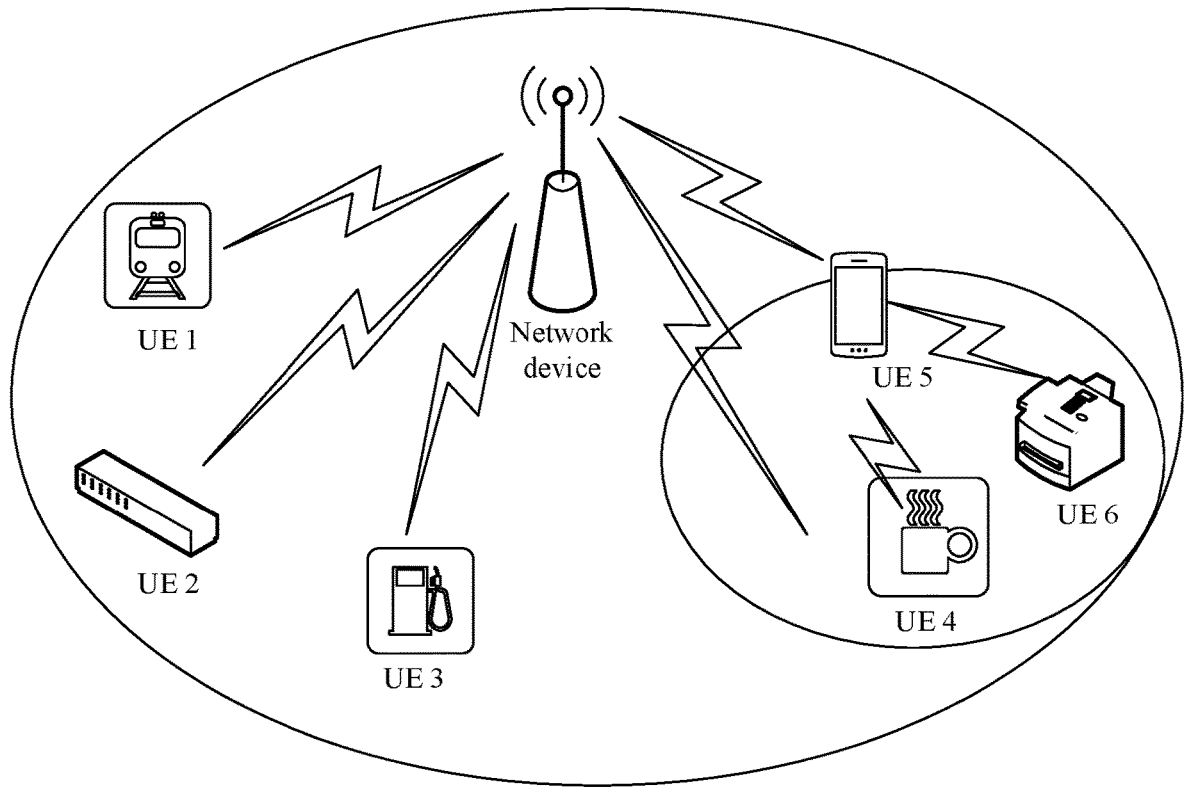
FIG. 1 is a schematic diagram of architecture of a communication system according to an embodiment of this application.

A buffer determining method provided in this application may be applied to a 5G new radio (new radio, NR) system, or may be applied to another communication system, for example, an Internet of things (internet of things, IoT) system, a V2X system, a narrow band Internet of things (narrow band internet of things, NB-IoT) system, an LTE system, a fifth generation (5G) communication system, hybrid architecture of LTE and 5G, an NR system, or a new communication system emerging in future communication development. The buffer determining method provided in embodiments of this application can be used as long as a terminal device in the communication system supports V2X sidelink communication (or SL communication or D2D communication).

The related terminal device in embodiments of this application is a user-side entity configured to receive or transmit a signal. The terminal device may be a device that provides a user with voice and/or data connectivity, for example, a handheld device or an in-vehicle device having a wireless connection function. The terminal device may alternatively be another processing device connected to a wireless modem. The terminal device may communicate with one or more core networks by using a radio access network (radio access network, RAN). The terminal device may also be referred to as a wireless terminal, a subscriber unit (subscriber unit), a subscriber station (subscriber station), a mobile station (mobile station), a mobile (mobile) console, a remote station (remote station), an access point (access point), a remote terminal (remote terminal), an access terminal (access terminal), a user terminal (user terminal), a user agent (user agent), a user device (user device), user equipment (user equipment, UE), or the like. The terminal device may be a mobile terminal, for example, a mobile phone (or referred to as a "cellular" phone), and a computer that has a mobile terminal. For example, the terminal device may be a portable, pocket-sized, handheld, computer built-in, or a vehicle-mounted mobile apparatus, which exchanges a voice and/or data with the radio access network. For example, the terminal device may alternatively be a device such as a personal communication service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). For example, a common terminal device includes a mobile phone, a tablet computer, a notebook computer, a palmtop computer, a mobile Internet device (mobile internet device, MID), and a wearable device such as a smartwatch, a smart band, or a pedometer, and a smart household device such as a smart refrigerator or a smart washer. However, embodiments of this application are not limited thereto.

It should be understood that the terminal in the embodiments of this application may further indicate a chip in the terminal device, a communication apparatus having a D2D or V2X communication function, a unit, or a module, for example, an in-vehicle communication apparatus, an in-vehicle communication module, or an in-vehicle communication chip.

The related network device in embodiments of this application is a network-side entity configured to receive or transmit a signal. For example, the network device may be an evolved NodeB (evolutional NodeB, eNB, or e-NodeB) in LTE, a new radio controller (new radio controller, NR controller), a gNodeB (gNB) in a 5G system, a centralized unit (centralized unit), a new radio base station, a remote radio module, a micro base station, a relay (relay), a distributed network element (distributed unit), a transmission reception point (transmission reception point, TRP), a transmission point (transmission point, TP), or any other wireless access device. However, embodiments of this application are not limited thereto.

With reference to FIG. 1, a communication system is provided in an embodiment of this application. The communication system includes a network device and six terminal devices, for example, UE 1 to UE 6. In the communication system, the UE 1 to the UE 6 may send signals to the network device on uplinks, and the network device may receive the uplink signals sent by the UE 1 to the UE 6. In addition, the UE 4 to the UE 6 may also form a sub-communication system. The network device may send downlink signals to the UE 1, the UE 2, the UE 3, and the UE 5 on downlinks. The UE 5 may send signals to the UE 4 and the UE 6 by using sidelinks (sidelink, SL) between terminals based on a V2X technology. FIG. 1 is merely a schematic diagram. This application sets no specific limitation on a type of the communication system, a quantity of devices included in the communication system, a type of the device, or the like.

Network architectures and service scenarios described in embodiments of this application are intended to describe the technical solutions in embodiments of this application more clearly, and do not constitute a limitation on the technical solutions provided in embodiments of this application. A person of ordinary skill in the art may learn that with evolution of the network architectures and emergence of new service scenarios, the technical solutions provided in embodiments of this application are also applicable to similar technical problems.

From the 3GPP Release 12, LTE starts to support device-to-device communication in a cellular network, which is referred to as D2D or Sidelink Communication. A D2D communication technology indicates a communication manner in which two peer user nodes directly communicate with each other. The D2D communication has different applications in different networks, for example, Wi-Fi® direct connection (Direct) or a Bluetooth technology (short range time division duplexing communication) in a Wi-Fi® network. The D2D aims to enable user communication devices to directly communicate with each other within a specific range, to reduce a load on a serving base station.

Currently, a method for calculating a size of a layer 2 buffer for Uu transmission is defined in a communication protocol. The size of the layer 2 buffer may be understood as a sum of quantities of bytes (bytes) that can be stored by UE in an RLC transmission window, RLC receiving and reordering windows, and a PDCP reordering window on all radio bearers. The size of the layer 2 buffer in the Uu transmission is a sum of an uplink total buffer size and a downlink total buffer size. Currently, how a terminal device on a sidelink calculates a buffer becomes a problem urgently to be resolved.

On this basis, this application provides a buffer determining method and apparatus, to resolve a problem of how a terminal device on a sidelink calculates a buffer size. The method and an apparatus are based on a same inventive concept. Because the method and the apparatus have a similar problem-resolving principle, for implementations of the apparatus and the method, refer to each other, and no repeated description is provided.

It should be noted that "a plurality of" indicates two or more in embodiments of this application. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. It should be understood that in the description of embodiments of this application, the words "first", "second", and the like are merely used for distinction description, and shall not be understood as an indication or implication of relative importance or an indication or implication of an order.

It should be understood that "Uu" described in embodiments of this application may be understood as a cellular link, and may include an uplink and a downlink. For ease of description, the cellular link is uniformly referred to as Uu in the following. For example, cellular link communication is uniformly referred to as Uu communication, cellular link transmission is uniformly referred to as Uu transmission, and cellular link round trip time is uniformly referred to as Uu round trip time.

Embodiments of this application are described in detail below with reference to specific accompanying drawings.

It should be understood that, in the embodiments of this application, the terminal device and/or the network device may perform some or all of the steps in embodiments of this application. These steps or operations are merely examples. In embodiments of this application, other operations or variants of operations may be further performed. In addition, the steps may be performed in different sequences presented in embodiments of this application, and not all operations in embodiments of this application may need to be performed.

Figure 2:
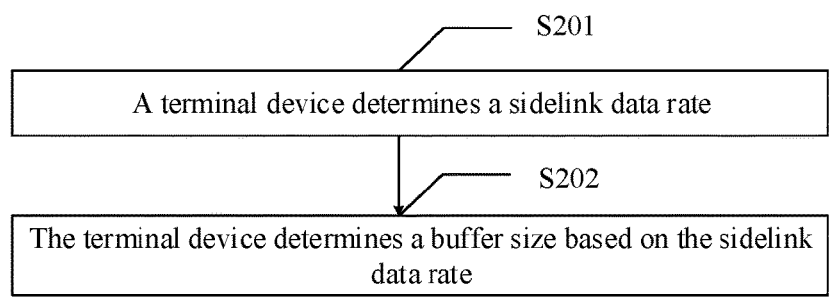
FIG. 2 is a schematic flowchart of a buffer determining method according to an embodiment of this application.

Embodiment 1: FIG. 2 is a flowchart of a buffer determining method according to an embodiment of this application. For a frequency band/a frequency band combination/a carrier/carrier aggregation/partial bandwidth for SL communication, the terminal device may determine a buffer size by using the method provided in Embodiment 1. The method includes:

S201: A terminal device determines a sidelink data rate. The sidelink data rate may be understood as a rate at which the terminal device transmits data in SL communication.

For example, the sidelink data rate may include a sidelink transmit data rate. Alternatively, the sidelink data rate may include a sidelink receive data rate. Alternatively, the sidelink data rate may include a sidelink transmit data rate and a sidelink receive data rate. Alternatively, the sidelink data rate is a maximum value in a sidelink transmit data rate and a sidelink receive data rate. The sidelink transmit data rate may be a maximum volume of data sent by the terminal device in a unit time on a sidelink. For example, the sidelink transmit data rate may be a maximum quantity of bits sent by the terminal device in 1 ms on a sidelink. The sidelink receive data rate may be a maximum volume of data received by the terminal device in a unit time on a sidelink. For example, the sidelink receive data rate may be a maximum quantity of bits received by the terminal device in 1 ms on a sidelink.

In an example description, the sidelink transmit data rate may be determined based on one or more of the following parameters: a quantity of transmit layers, a transmit modulation order number, and an overhead. The quantity of transmit layers is a maximum quantity of sidelink transmit layers supported by the terminal device. The transmit modulation order number is a maximum modulation order number supported by the terminal device for sidelink transmission. The overhead is a parameter value greater than 0 and not greater than 1.

The sidelink receive data rate may be determined based on one or more of the following parameters: a quantity of receive layers, a receive modulation order number, and an overhead. The quantity of receive layers is a maximum quantity of sidelink transmit layers supported by the terminal device. The receive modulation order number is a maximum modulation order number supported by the terminal device for sidelink reception. The overhead is a parameter value greater than 0 and not greater than 1.

In an example description, an overhead used by the terminal device when calculating the sidelink transmit data rate may be the same as or different from an overhead used by the terminal device when calculating the sidelink receive data rate.

In an example description, the sidelink transmit data rate may meet the following formula. Alternatively, it may be understood as determining the sidelink transmit data rate by using the following formula:

$$SLTXDataRate = 10^{-6} \times \left( v_{Layers} \times Q_m \times f \times R_{max} \times \frac{N_{PRB}^{BW,\mu} \times 12}{T_s^{\mu}} \times (1 - OH) \right)$$

Herein, SLTXDataRate is the sidelink transmit data rate.

The sidelink receive data rate may meet the following formula. Alternatively, it may be understood as determining the sidelink receive data rate by using the following formula:

$$SLRXDataRate = 10^{-6} \times \left( v_{Layers} \times Q_m \times f \times R_{max} \times \frac{N_{PRB}^{BW,\mu} \times 12}{T_s^{\mu}} \times (1 - OH) \right)$$

Herein, SLRXDataRate is the sidelink receive data rate.

For the SL communication, $v_{Layers}$ may be determined based on a transmission capability of UE. The sidelink transmit data rate meets the foregoing formula. Alternatively, when the sidelink transmit data rate is determined by using the foregoing formula, $v_{Layers}$ may be a maximum quantity of transmit layers supported by the UE. For example, if the terminal device has a capability of supporting layer 2 sidelink transmission of a physical Sidelink shared channel (physical sidelink shared channel, PSSCH). In other words, when the terminal device can support PSSCH transmission at a rank 2, $v_{Layers}$ may be 2; or otherwise, $v_{Layers}$ may be 1. SLDataRate is the sidelink receive data rate. In other words, the sidelink receive data rate meets the foregoing formula. Alternatively, when the sidelink receive data rate is determined by using the foregoing formula, $v_{Layers}$ may be a maximum quantity of receive layers supported by the UE. For example, if the terminal device has a capability of supporting layer 2 sidelink reception of a PSSCH, that is, the terminal device supports PSSCH transmission at a rank 2, $v_{Layers}$ may be 2; or otherwise, $v_{Layers}$ may be 1.

For example, $v_{Layers}$ may be preconfigured, or $v_{Layers}$ may be predefined, or $v_{Layers}$ may be configured by a network device, or $v_{Layers}$ may be determined by a terminal device.

For the SL communication, $Q_m$ may be determined based on a capability of the UE. Herein, SLDataRate is the sidelink transmit data rate. In other words, the sidelink transmit data rate meets the foregoing formula. Alternatively, when the sidelink transmit data rate is determined by using the foregoing formula, $Q_m$ may be a transmit modulation order number. For example, if the terminal device has a capability of supporting 256 quadrature amplitude modulation (quadrature amplitude modulation, QAM) transmission, $Q_m$ may be 8; or otherwise, $Q_m$ may be 6. Herein, SLDataRate is the sidelink receive data rate. In other words, the sidelink receive data rate meets the foregoing formula. Alternatively, when the sidelink receive data rate is determined by using the foregoing formula, $Q_m$ may be a receive modulation order number. For example, if the terminal device has a capability of supporting 256 QAM reception, $Q_m$ may be 8; or otherwise, $Q_m$ may be 6. For example, for sidelink reception, if 256 QAM reception is a mandatory feature of the terminal device, $Q_m$ may be 8.

Herein, f is an adjustment factor. For example, f may be indicated by an upper-level parameter: a scaling factor (scalingFactor). For example, f may be but is not limited to a value of 1, 0.8, 0.75, or 0.4.

Herein, $R_{max}$ is a maximum target bit rate. For example, $R_{max}$ may be $$\frac{948}{1024}.$$

μ is a granularity (numerology).

$T_s^\mu$ is an average orthogonal frequency division multiplexing (orthogonal frequency division multiplexing, OFDM) symbol length in a slot with a granularity of μ. For example, if a cyclic prefix (cyclic prefix, CP) type is a normal CP (normal cyclic prefix, NCP), $$T_s^\mu = \frac{10^{-3}}{14 \cdot 2^\mu};$$

or if a CP type is an extended CP (extended cyclic prefix, ECP), $$T_s^\mu = \frac{10^{-3}}{12 \cdot 2^\mu}.$$

$N_{PRB}^{BW,\mu}$ is a maximum quantity of allocated resource blocks (resource block, RB) in a bandwidth BW with a granularity of μ. Herein, BW may be a maximum bandwidth supported by the terminal device in a given frequency band or frequency band combination.

Figure 3:
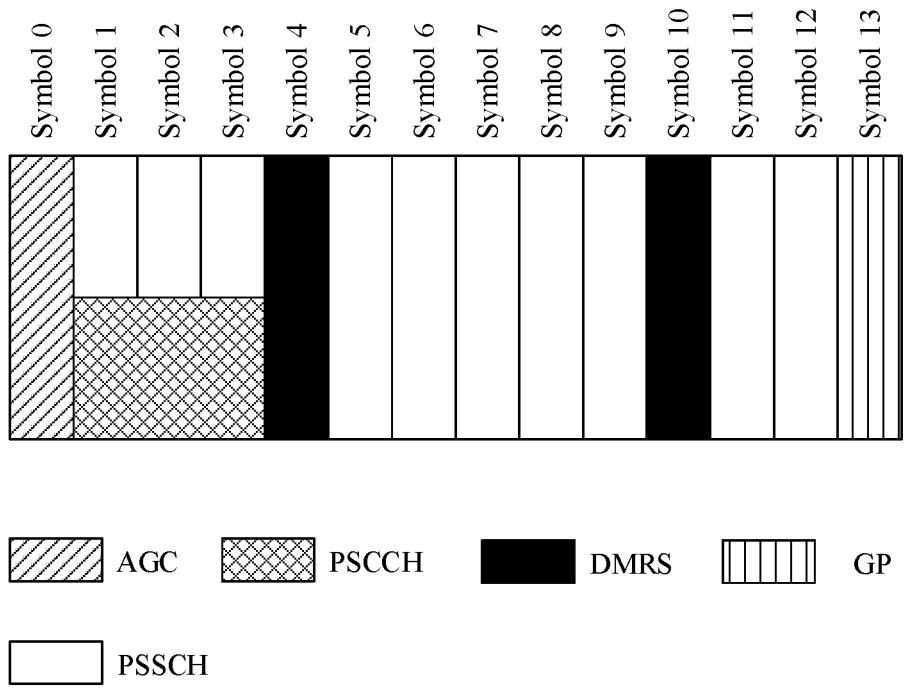
FIG. 3 is a schematic diagram of a slot according to an embodiment of this application.

Herein, OH is an overhead, and OH may be related to at least one of the following parameters: an automatic gain control (automatic gain control, AGC) symbol, a guard period (guard period, GP) symbol, a physical sidelink feedback channel (physical sidelink feedback channel, PSFCH) resource configuration period, and a reference signal (reference signal, RS). Not all symbols in a slot are used to transmit data. Some symbols are used for transmission of the AGC, the GP, the PSCCH, the PSFCH, and the reference signal. For example, as shown in FIG. 3, one slot has 14 symbols, respectively a symbol 0 to a symbol 13. The symbol 0 is used for the AGC, and the symbol 1 to the symbol 3 are used for transmission of a physical Sidelink control channel (physical sidelink control channel, PSCCH). The symbol 13 is the GP. The symbols 4 and 10 are the DMRS. Therefore, there are 10 symbols used to transmit data.

For example, OH may have at least one of the following correspondences:

a correspondence between OH and the physical sidelink feedback channel (physical sidelink feedback channel, PSFCH) resource period, that is, different PSFCH resource periods correspond to different overhead values;

a correspondence between OH and the PSFCH;

a correspondence between OH and a CP type; and a correspondence between OH and a frequency range.

For example, there is a correspondence between OH and the PSFCH resource period. A different PSFCH resource period corresponds to a different overhead.

The following provides example descriptions by using an example in which the CP type is the NCP, the DMRS occupies 1.5 symbols, a channel state information reference signal (channel state information reference signal, CSI-RS) occupies 0 symbols, a phase tracking reference signal (Phase Tracking Reference Signal, PT-RS) occupies 0 symbols, sidelink control information (sidelink control information, SCI) occupies 0.38 symbols, the GP occupies 1 symbol, and the AGC occupies 1 symbol.

If the PSFCH resource period is 0, the PSFCH occupies 0 symbols. Therefore, a quantity of symbols not used for data transmission is 3.88, and OH may be 0.28. Herein, sl-PSFCH-Period-r16 is a parameter configured in a resource pool, and is used to indicate the PSFCH resource period.

If the PSFCH resource period is 1, the PSFCH occupies 3 symbols. Therefore, a quantity of symbols not used for data transmission is 6.88, and OH may be 0.49.

If the PSFCH resource period is 2, the PSFCH occupies 1.5 symbols on average. Therefore, a quantity of symbols not used for data transmission is 5.38, and OH may be 0.38.

If the PSFCH resource period is 4, the PSFCH occupies 0.75 symbols on average. Therefore, a quantity of symbols not used for data transmission is 4.63, and OH may be 0.33.

For example, the correspondence between OH and the PSFCH resource period may be shown in Table 1a.

TABLE 1a

| PSFCH resource period | PSFCH symbol quantity | DMRS symbol quantity | CSI-RS/PT-RS symbol quantity | SCI symbol quantity | GP symbol quantity | AGC symbol quantity | Quantity of symbols not used for data transmission | OH |
|---|---|---|---|---|---|---|---|---|
| 0 | 0 | 1.5 | 0 | 0.38 | 1 | 1 | 3.88 | 0.28 |
| 1 | 3 | 1.5 | 0 | 0.38 | 1 | 1 | 6.88 | 0.49 |
| 2 | 1.5 | 1.5 | 0 | 0.38 | 1 | 1 | 5.38 | 0.38 |
| 4 | 0.75 | 1.5 | 0 | 0.38 | 1 | 1 | 4.63 | 0.33 |

Alternatively, the correspondence between OH and the PSFCH resource period may be shown in Table 1b.

TABLE 1b

| PSFCH resource period | OH |
|---|---|
| 0 | 0.28 |
| 1 | 0.49 |

For another example, there is a correspondence between OH and each of the PSFCH resource period and the CP type. A different PSFCH resource period corresponds to a different CP type and a different overhead. In other words, a different PSFCH resource period and a different CP type correspond to a different overhead value.

Description is provided by using an example in which the DMRS occupies 1.5 symbols, the CSI-RS/PT-RS occupies 0 symbols, the SCI occupies 0.38 symbols, the GP occupies 1 symbol, and the AGC occupies 1 symbol.

If the CP type is the NCP, and the PSFCH resource period is 0, the PSFCH occupies 0 symbols. Therefore, a quantity of symbols not used for data transmission is 3.88, and OH may be 3.88/14, which is approximately 0.28.

If the CP type is the NCP, and the PSFCH resource period is 1, the PSFCH occupies 3 symbols on average. Therefore, a quantity of symbols not used for data transmission is 6.88, and OH may be 6.88/14, which is approximately 0.49.

If the CP type is the NCP, and the PSFCH resource period is 2, the PSFCH occupies 1.5 symbols on average. Therefore, a quantity of symbols not used for data transmission is 5.38, and OH may be 5.38/14, which is approximately 0.38.

If the CP type is the NCP, and the PSFCH resource period is 4, the PSFCH occupies 0.75 symbols on average. Therefore, a quantity of symbols not used for data transmission is 4.63, and OH may be 4.63/14, which is approximately 0.33.

If the CP type is the ECP, and the PSFCH resource period is 0, the PSFCH occupies 0 symbols. Therefore, a quantity of symbols not used for data transmission is 3.88, and OH may be 3.88/12, which is approximately 0.32.

If the CP type is the ECP, and the PSFCH resource period is 1, the PSFCH occupies 3 symbols on average. Therefore, a quantity of symbols not used for data transmission is 6.88, and OH may be 6.88/12, which is approximately 0.57.

If the CP type is the ECP, and the PSFCH resource period is 2, the PSFCH occupies 1.5 symbols on average. Therefore, a quantity of symbols not used for data transmission is 5.38, and OH may be 5.38/12, which is approximately 0.45.

If the CP type is the ECP, and the PSFCH resource period is 4, the PSFCH occupies 0.75 symbols on average. Therefore, a quantity of symbols not used for data transmission is 4.63, and OH may be 4.63/12, which is approximately 0.39.

For example, the correspondence between OH and each of the PSFCH resource period and the CP type may be shown in Table 2a.

TABLE 2a

| CP type | PSFCH resource period | PSFCH symbol quantity | DMRS symbol quantity | CSI-RS/PT-RS symbol quantity | SCI symbol quantity | GP symbol quantity | AGC symbol quantity | Quantity of symbols not used for data transmission | OH |
|---|---|---|---|---|---|---|---|---|---|
| NCP | 0 | 0 | 1.5 | 0 | 0.38 | 1 | 1 | 3.88 | 0.28 |
|  | 1 | 3 | 1.5 | 0 | 0.38 | 1 | 1 | 6.88 | 0.49 |
|  | 2 | 1.5 | 1.5 | 0 | 0.38 | 1 | 1 | 5.38 | 0.38 |
|  | 4 | 0.75 | 1.5 | 0 | 0.38 | 1 | 1 | 4.63 | 0.33 |
| ECP | 0 | 0 | 1.5 | 0 | 0.38 | 1 | 1 | 3.88 | 0.32 |
|  | 1 | 3 | 1.5 | 0 | 0.38 | 1 | 1 | 6.88 | 0.57 |
|  | 2 | 1.5 | 1.5 | 0 | 0.38 | 1 | 1 | 5.38 | 0.45 |
|  | 4 | 0.75 | 1.5 | 0 | 0.38 | 1 | 1 | 4.63 | 0.39 |

TABLE 1b-continued

| PSFCH resource period | OH |
|---|---|
| 2 | 0.38 |
| 4 | 0.33 |

Alternatively, the correspondence between OH and each of the PSFCH resource period and the CP type may be shown in Table 2b.

TABLE 2b

| CP type | PSFCH resource period | OH |
|---|---|---|
| NCP | 0 | 0.28 |
|  | 1 | 0.49 |
|  | 2 | 0.38 |
|  | 4 | 0.33 |
| ECP | 0 | 0.32 |
|  | 1 | 0.57 |
|  | 2 | 0.45 |
|  | 4 | 0.39 |

For another example, there is a correspondence between OH and the frequency range. A different frequency range corresponds to a different overhead. In other words, a different PSFCH resource period and a different CP type correspond to a different overhead value.

Description is provided by using an example in which the CP type is the NCP, the PSFCH is not considered, the DMRS occupies 1.5 symbols, the SCI occupies 0.38 symbols, the GP occupies 1 symbol, and the AGC occupies 1 symbol.

If the frequency range is FR1, the CSI-RS/PT-RS occupies 0 symbols. Therefore, a quantity of symbols not used for data transmission is 3.88, and OH may be 3.88/14, which is approximately 0.277.

If the frequency range is FR2, the CSI-RS/PT-RS occupies 0.01 symbols. Therefore, a quantity of symbols not used for data transmission is 3.89, and OH may be 3.89/14, which is approximately 0.278.

For example, the correspondence between OH and the frequency range may be shown in Table 3a.

TABLE 3a

| Frequency range | PSFCH symbol quantity | DMRS symbol quantity | CSI-RS/PT-RS symbol quantity | SCI symbol quantity | GP symbol quantity | AGC symbol quantity | Quantity of symbols not used for data transmission | OH |
|---|---|---|---|---|---|---|---|---|
| FR1 | 0 | 1.5 | 0 | 0.38 | 1 | 1 | 3.88 | 0.277 |
| FR2 | 3 | 1.5 | 0.01 | 0.38 | 1 | 1 | 3.89 | 0.278 |

Alternatively, the correspondence between OH and the frequency range may be shown in Table 3b.

TABLE 3b

| Frequency range | OH |
|---|---|
| FR1 | 0.277 |
| FR2 | 0.278 |

Description is provided by using an example in which the CP type is the ECP, the PSFCH is not considered, the DMRS occupies 1.5 symbols, the SCI occupies 0.38 symbols, the GP occupies 1 symbol, and the AGC occupies 1 symbol.

If the frequency range is FR1, the CSI-RS/PT-RS occupies 0 symbols. Therefore, a quantity of symbols not used for data transmission is 3.88, and OH may be 3.88/12, which is approximately 0.323.

If the frequency range is FR2, the CSI-RS/PT-RS occupies 0.01 symbols. Therefore, a quantity of symbols not used for data transmission is 3.89, and OH may be 3.89/12, which is approximately 0.324.

For example, the correspondence between OH and the frequency range may be shown in Table 4a.

TABLE 4a

| Frequency range | PSFCH symbol quantity | DMRS symbol quantity | CSI-RS/PT-RS symbol quantity | SCI symbol quantity | GP symbol quantity | AGC symbol quantity | Quantity of symbols not used for data transmission | OH |
|---|---|---|---|---|---|---|---|---|
| FR1 | 0 | 1.5 | 0 | 0.38 | 1 | 1 | 3.88 | 0.323 |
| FR2 | 3 | 1.5 | 0.01 | 0.38 | 1 | 1 | 3.89 | 0.324 |

Alternatively, the correspondence between OH and the frequency range may be shown in Table 4b.

TABLE 4b

| Frequency range | OH |
|---|---|
| FR1 | 0.323 |
| FR2 | 0.324 |

For another example, there is a correspondence between OH and each of the PSFCH resource period, the frequency range, and the CP type. In other words, a different PSFCH resource period, a different CP type, and a different frequency range correspond to a different overhead value.

Description is provided by using an example in which the DMRS occupies 1.5 symbols, the SCI occupies 0.38 symbols, the GP occupies 1 symbol, and the AGC occupies 1 symbol. For example, the correspondence between OH and each of the PSFCH resource period, the frequency range, and the CP type may be shown in Table 5a.

TABLE 5a

| Frequency range | CP type | PSFCH resource period | PSFCH symbol quantity | DMRS symbol quantity | CSI-RS/PT-RS symbol quantity | SCI symbol quantity | GP symbol quantity | AGC symbol quantity | Quantity of symbols not used for data transmission | OH |
|---|---|---|---|---|---|---|---|---|---|---|
| FR1 | NCP | 0 | 0 | 1.5 | 0 | 0.38 | 1 | 1 | 3.88 | 0.2771 |
|  |  | 1 | 3 | 1.5 | 0 | 0.38 | 1 | 1 | 6.88 | 0.4914 |
|  |  | 2 | 1.5 | 1.5 | 0 | 0.38 | 1 | 1 | 5.38 | 0.3843 |
|  |  | 4 | 0.75 | 1.5 | 0 | 0.38 | 1 | 1 | 4.63 | 0.3307 |
|  | ECP | 0 | 0 | 1.5 | 0 | 0.38 | 1 | 1 | 3.88 | 0.3233 |
|  |  | 1 | 3 | 1.5 | 0 | 0.38 | 1 | 1 | 6.88 | 0.5733 |
|  |  | 2 | 1.5 | 1.5 | 0 | 0.38 | 1 | 1 | 5.38 | 0.4483 |
|  |  | 4 | 0.75 | 1.5 | 0 | 0.38 | 1 | 1 | 4.63 | 0.3858 |

TABLE 5a-continued

| Frequency range | CP type | PSFCH resource period | PSFCH symbol quantity | DMRS symbol quantity | CSI-RS/PT-RS symbol quantity | SCI symbol quantity | GP symbol quantity | AGC symbol quantity | Quantity of symbols not used for data transmission | OH |
|---|---|---|---|---|---|---|---|---|---|---|
| FR2 | NCP | 0 | 0 | 1.5 | 0.01 | 0.38 | 1 | 1 | 3.89 | 0.2779 |
|  |  | 1 | 3 | 1.5 | 0.01 | 0.38 | 1 | 1 | 6.89 | 0.4921 |
|  |  | 2 | 1.5 | 1.5 | 0.01 | 0.38 | 1 | 1 | 5.39 | 0.3850 |
|  |  | 4 | 0.75 | 1.5 | 0.01 | 0.38 | 1 | 1 | 4.64 | 0.3314 |
|  | ECP | 0 | 0 | 1.5 | 0.01 | 0.38 | 1 | 1 | 3.89 | 0.3242 |
|  |  | 1 | 3 | 1.5 | 0.01 | 0.38 | 1 | 1 | 6.89 | 0.5742 |
|  |  | 2 | 1.5 | 1.5 | 0.01 | 0.38 | 1 | 1 | 5.39 | 0.4492 |
|  |  | 4 | 0.75 | 1.5 | 0.01 | 0.38 | 1 | 1 | 4.64 | 0.3867 |

Alternatively, the correspondence between OH and each of the PSFCH resource period, the frequency range, and the CP type may be shown in Table 5b.

TABLE 5b

| Frequency range | CP type | PSFCH resource period | OH |
|---|---|---|---|
| FR1 | NCP | 0 | 0.2771 |
|  |  | 1 | 0.4914 |
|  |  | 2 | 0.3843 |
|  |  | 4 | 0.3307 |
|  | ECP | 0 | 0.3233 |
|  |  | 1 | 0.5733 |
|  |  | 2 | 0.4483 |
|  |  | 4 | 0.3858 |
| FR2 | NCP | 0 | 0.2779 |
|  |  | 1 | 0.4921 |
|  |  | 2 | 0.3850 |
|  |  | 4 | 0.3314 |
|  | ECP | 0 | 0.3242 |
|  |  | 1 | 0.5742 |
|  |  | 2 | 0.4492 |
|  |  | 4 | 0.3867 |

For another example, there is a correspondence between OH and the PSFCH. A case in which the PSFCH is considered and a case in which the PSFCH is not considered correspond to different overhead values.

For example, the correspondence between OH and the PSFCH may be shown in Table 5c.

TABLE 5c

| Whether the PSFCH is considered | OH |
|---|---|
| The PSFCH is not considered | 0.28 |
| The PSFCH is considered | 0.40 |

For another example, OH may include a plurality of parameters. For example, is equal to at least one or more of an overhead related to a PSFCH resource, an overhead related to the DMRS, an overhead related to the CSI-RS, an overhead related to the PT-RS, an overhead related to the GP, and an overhead related to the AGC. For example, the overhead OH is equal to a sum of the PSFCH overhead, the RS overhead, the SCI overhead, the GP overhead, and the AGC overhead.

For another example, OH is a range corresponding to a quantity of symbols occupied by the PSSCH. For example, the quantity of symbols occupied by the PSSCH is 3-10, and a corresponding overhead value in a case of the NCP is 11-4 symbols. In this case, the corresponding OH range is 4/14 to 11/14, that is, from 0.29 to 0.79.

It should be understood that the foregoing listed overhead values are merely example descriptions. In specific implementation, precision of the overhead may be one decimal place, two decimal places, three decimal places, or the like. The precision of the overhead is not specifically limited herein. In addition, the overhead may be determined through rounding up when the overhead is calculated. For example, it is assumed that the precision of the overhead is two decimal places. If the calculated overhead value is 0.5733, the value of the overhead may be 0.58; or if the calculated overhead value is 0.4492, the value of the overhead may be 0.45; or the like. Alternatively, the overhead may be determined through rounding down when the overhead is calculated. For example, it is assumed that the precision of the overhead is two decimal places. If the calculated overhead value is 0.5733, the value of the overhead may be 0.57; or if the calculated overhead value is 0.4492, the value of the overhead may be 0.44; or the like. Alternatively, the overhead may be determined through rounding off when the overhead is calculated. For example, it is assumed that the precision of the overhead is two decimal places. If the calculated overhead value is 0.5733, the value of the overhead may be 0.57; or if the calculated overhead value is 0.4492, the value of the overhead may be 0.45; or the like. This is not specifically limited.

In another example description, the sidelink transmit data rate and the sidelink receive data rate may meet the following formula. Alternatively, it may be understood as determining the sidelink transmit data rate and the sidelink receive data rate by using the following formula:

$$DataRate = 10^{-6} \times \sum_{j=1}^{J} \left( v_{Layers}^{(j)} \times Q_m^{(j)} \times f^{(j)} \times R_{max} \times \frac{N_{PRB}^{BW^{(j)},\mu} \times 12}{T_s^\mu} \times (1 - OH^{(j)}) \right)$$

In the SL communication, J may be equal to 1. In the sidelink communication, that is, the V2X sidelink communication, for $v_{Layers}^{(j)}$, $Q_m^{(j)}$, $f^{(j)}$, $R_{max}$, $\mu$, $T_s^\mu$, $N_{PRB}^{BW^{(j)},\mu}$, and $OH^{(j)}$, refer to related descriptions of $v_{Layers}$, $Q_m$, f, $R_{max}$, $\mu$, $T_s^\mu$, $N_{PRB}^{BW,\mu}$, and OH in Embodiment 1.

S202: The terminal device determines a buffer size (buffer size) based on the sidelink data rate. The buffer size may be understood as a size of a buffer.

For example, the buffer size may be a total size of the layer 2 buffer. The buffer size may be defined as a sum of quantities of bytes (bytes) that can be stored within an RLC transmission window, RLC receiving and reordering windows, and a PDCP reordering window on all radio bearers. The buffer size may be further defined as a sum of quantities of bytes that can be stored within a PDCP reordering window on all radio bearers. The buffer size may be further defined as a sum of quantities of bytes that can be stored by the terminal device in a sidelink round trip time.

In an implementation, the terminal device may determine the buffer size based on the sidelink data rate and the sidelink round trip time (round trip time, RTT). The sidelink round trip time is a round trip time (round trip time, RTT) at a radio link control (radio link control, RLC) layer in the SL communication. The sidelink round trip time may further be a round trip time at a PDCP layer in the sidelink communication. The sidelink round trip time may further be a reordering time at a PDCP layer in the sidelink communication. The sidelink round trip time may further be an RLC layer round trip time in a unicast scenario, or may be a maximum value in round trip times corresponding to unicast, multicast, and broadcast.

In an example description, the sidelink data rate is a maximum value in calculated sidelink data rates for frequency bands and/or frequency band combinations.

In an example description, the buffer size is determined based on the sidelink transmit data rate, the sidelink receive data rate, and the sidelink round trip time. It may also be understood that the buffer size may be equal to a sum of the sidelink transmit buffer size and the sidelink receive buffer size. For example, the buffer size may meet the following formula. Alternatively, it may be understood as determining the buffer size by using the following formula:

Buffer Size=SLTXDataRate×SL RTT+SLRXDataRate×SL RTT

Herein, Buffer Size is the buffer size; SLTXDataRate is the sidelink transmit data rate, or a maximum value in calculated sidelink transmit data rates for supported frequency bands or frequency band combinations; SLRXDataRate is the sidelink receive data rate, or a maximum value in calculated sidelink receive data rates for supported frequency bands or frequency band combinations; SL RTT is the sidelink round trip time; and a product of SLTXDataRate and SL RTT is a sidelink transmit buffer size, and a product of SLRXDataRate and SL RTT is a sidelink receive buffer size.

In another example description, the buffer size is determined based on the sidelink transmit data rate, the sidelink receive data rate, the sidelink transmit round trip time, and the sidelink receive round trip time. It may also be understood as that the buffer size may meet the following formula. Alternatively, it may be understood as determining the buffer size by using the following formula:

Buffer Size=SLTXDataRate×SL TX RTT+SLRXDataRate×SL RX RTT

Herein, Buffer Size is the buffer size; SLTXDataRate is the sidelink transmit data rate, or a maximum value in calculated sidelink transmit data rates for supported frequency bands or frequency band combinations; SLRXDataRate is the sidelink receive data rate, or a maximum value in calculated sidelink receive data rates for supported frequency bands or frequency band combinations; SL TX RTT is the sidelink transmit-side round trip time; and SL RX RTT is a sidelink receive-side round trip time.

In another example description, the buffer size may meet the following formula. Alternatively, it may be understood as determining the buffer size by using the following formula:

Buffer Size=SLDataRate×SL RTT

Herein, Buffer Size is the buffer size; SLDataRate is the sidelink transmit data rate, or a maximum value in calculated sidelink transmit data rates for supported frequency bands or frequency band combinations, or the sidelink receive data rate, or a maximum value in calculated sidelink receive data rates for supported frequency bands or frequency band combinations, or a maximum value in the sidelink transmit data rate and the sidelink receive data rate, or a larger value of a maximum value in calculated sidelink transmit data rates for supported frequency bands or frequency band combinations and a maximum value in calculated sidelink receive data rates for supported frequency bands or frequency band combinations; and SL RTT is the sidelink round trip time.

In some embodiments, there is a correspondence between the sidelink round trip time and subcarrier spacing (subcarrier space, SCS) of a sidelink frequency band. A correspondence between the sidelink round trip time and the SCS of the sidelink frequency band may be but is not limited to a form such as a table, a list, or a formula.

Further, the sidelink round trip time may be determined based on a first list. The first list includes a round trip time corresponding to subcarrier spacing of at least one sidelink frequency band.

Multiplexing can be implemented between the sidelink round trip time and an RLC RTT of an NR cell group. In other words, the RTT in the SL communication and the RTT in the Uu communication are determined based on the same list, that is, the first list.

For example, the first list may be shown in Table 6.

TABLE 6

| SCS | RTT (ms) |
| --- | --- |
| 15 kHz | 50 |
| 30 kHz | 40 |
| 60 kHz | 30 |
| 120 kHz | 20 |

Alternatively, the first list may be a list defined for the SL communication. In an example description, the sidelink round trip time is related to a cast (cast) type. The cast type may include one or more of unicast, multicast, and broadcast. The sidelink round trip time corresponds to different values in different cast types. For example, the RTT preconfigured in each resource pool has three values, which may be respectively a unicast RTT, a broadcast RTT, and a multicast RTT. When the buffer size is calculated, the sidelink round trip time may be a maximum value in the unicast RTT, the multicast RTT, and the broadcast RTT, that is, the sidelink round trip time=max (the unicast RTT, the multicast RTT, and the broadcast RTT). Alternatively, the sidelink round trip time=the unicast RTT+the multicast RTT+the broadcast RTT.

The RTT may have one or more values. Different values of the RTT represent different buffer levels.

In an example description, the sidelink round trip time is predefined, preconfigured, or preconfigured or configured in each resource pool. For example, the values of the sidelink round trip time are different in different granularities, and these values are preconfigured for each resource pool. Alternatively, each granularity is related to a plurality of sidelink round trip times, including a sidelink round trip time corresponding to sidelink transmission and a sidelink round trip time corresponding to sidelink reception. Alternatively, the sidelink round trip time related to each granularity has a plurality of values, and the plurality of values correspond to a delay level or a buffer level.

In another example description, the sidelink round trip time includes a sidelink transmit-side round trip time and a sidelink receive-side round trip time. The sidelink transmit-side round trip time and the sidelink receive-side round trip time are separately configured or pre-configured or pre-defined. For example, the sidelink transmit-side round trip time and the sidelink receive-side round trip time may be separately preconfigured in a protocol. Each SCS is related to a different value. For example, when the SCS is 15 kHz, a related RTT may be a first value; or when the SCS is 30 kHz, a related RTT may be a second value.

In another example description, the sidelink round trip time may be a round trip time of an RLC layer. In other words, the sidelink round trip time may be a time interval between initial transmission and retransmission of the RLC layer. For example, the sidelink round trip time may be determined based on a hybrid automatic repeat request (hybrid automatic repeat request, HARQ) round trip time and a time length of RLC polling.

Figure 4:
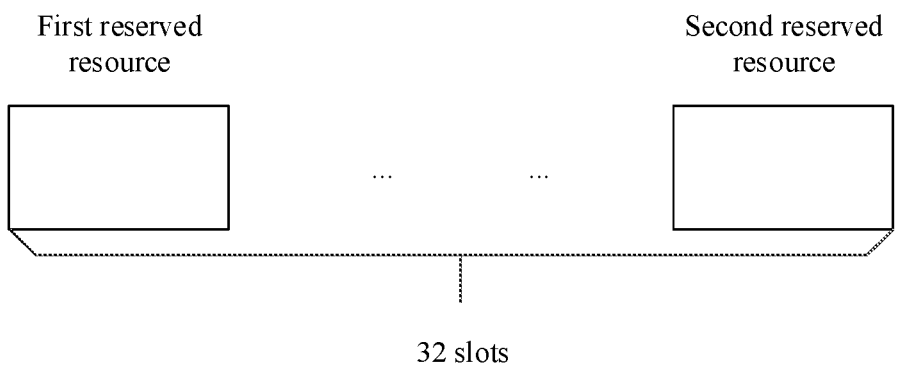
FIG. 4 is a schematic diagram of a reserved resource according to an embodiment of this application.

Based on an SL resource allocation mechanism, reserved resources are in 32 slots. In other words, resources reserved in one transport block within one resource reservation period need to be in 32 slots. In an example description, the terminal device may reserve two resources. A first reserved resource is used for the initial transmission, and a second reserved resource is used for the retransmission. A time interval between the initial transmission and first possible retransmission may be a maximum of 31 slots. For example, as shown in FIG. 4, a HARQ RTT may be a maximum of 31 slots, and the HARQ RTT may be understood as the time interval between the initial transmission and the retransmission.

Figure 5:
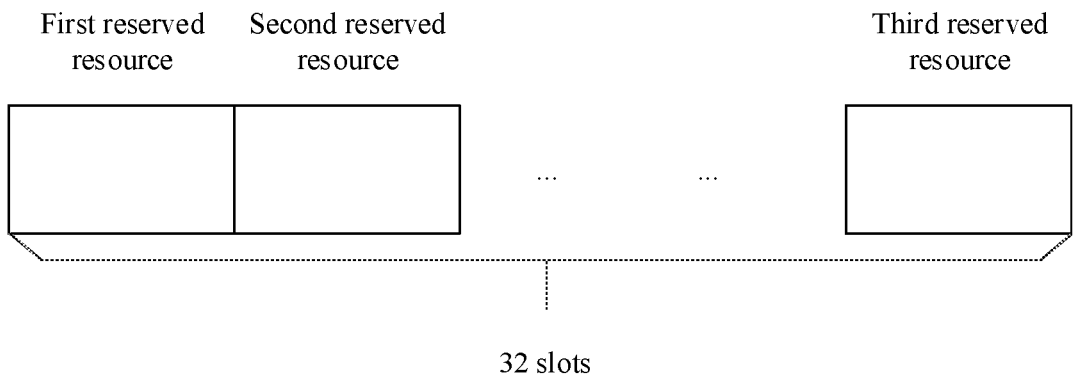
FIG. 5 is a schematic diagram of another reserved resource according to an embodiment of this application.

In another example description, the terminal device may alternatively reserve three resources. A first reserved resource is used for the initial transmission, and remaining resources are used for the retransmission. A time interval between the first reserved resource and a second reserved resource may be a minimum of 1 slot. For example, as shown in FIG. 5, a HARQ RTT may be a minimum of 1 slot.

It should be noted that a quantity of reserved resources of the terminal device is not limited to two or three, or may be another number. This is not specifically limited herein.

In some embodiments, the sidelink round trip time may be a sum of a time length of RLC polling and n times a maximum value (that is, 31 slots) of a HARQ round trip time. Herein, n is an integer greater than 0.

For example, n is 5. If the SCS is 15 kHz, a time length of one slot is 1 ms, a time length of RLC polling is 32 ms, and a sidelink round trip time is 187 ms. If the SCS is 30 kHz, a time length of one slot is 0.5 ms, a time length of RLC polling is 16 ms, and a sidelink round trip time is 94 ms. If the SCS is 60 kHz, a time length of one slot is 0.25 ms, a time length of RLC polling is 8 ms, and a sidelink round trip time is 47 ms. If the SCS is 120 kHz, a time length of one slot is 0.125 ms, a time length of RLC polling is 4 ms, and a sidelink round trip time is 23 ms.

For example, a correspondence between the sidelink round trip time and the SCS may be shown in Table 7.

TABLE 7

| SCS | Sidelink round trip time (ms) |
|---|---|
| 15 kHz | 187 |
| 30 kHz | 94 |
| 60 kHz | 47 |
| 120 kHz | 23 |

Alternatively, the sidelink round trip time may be a sum of a time length of RLC polling and n times a minimum value (that is, 1 slot) of a HARQ round trip time.

For example, n is 5. A correspondence between the sidelink round trip time and the SCS may be shown in Table 8.

TABLE 8

| SCS | Sidelink round trip time (ms) |
|---|---|
| 15 kHz | 37 |
| 30 kHz | 19 |
| 60 kHz | 9 |
| 120 kHz | 5 |

Alternatively, the sidelink round trip time is an average value of a first value and a second value. The first value is a sum of a time length of RLC polling and n times a maximum value (that is, 31 slots) of a HARQ round trip time, and the second value is a sum of the time length of the RLC polling and n times a minimum value (that is, 1 slot) of the HARQ round trip time.

For example, n is 5. A correspondence between the sidelink round trip time and the SCS may be shown in Table 9.

TABLE 9

| SCS | Sidelink round trip time (ms) |
|---|---|
| 15 kHz | 112 |
| 30 kHz | 56 |
| 60 kHz | 28 |
| 120 kHz | 14 |

In some other embodiments, the sidelink round trip time may be m times a maximum value (that is, 31 slots) of a HARQ round trip time. Herein, m is an integer greater than 0.

For example, m is 6. A correspondence between the sidelink round trip time and the SCS may be shown in Table 10a.

TABLE 10a

| SCS | Sidelink round trip time (ms) |
|---|---|
| 15 kHz | 186 |
| 30 kHz | 93 |
| 60 kHz | 47 |
| 120 kHz | 23 |

For another example, m is 32. A correspondence between the sidelink round trip time and the SCS may be shown in Table 10b.

TABLE 10b

| SCS | Sidelink round trip time (ms) |
|---|---|
| 15 kHz | 992 |
| 30 kHz | 496 |
| 60 kHz | 248 |
| 120 kHz | 124 |

Alternatively, the sidelink round trip time may be m times a minimum value (that is, 1 slot) of a HARQ round trip time.

For example, m is 6. A correspondence between the sidelink round trip time and the SCS may be shown in Table 11a.

TABLE 11a

| SCS | Sidelink round trip time (ms) |
| --- | --- |
| 15 kHz | 6 |
| 30 kHz | 3 |
| 60 kHz | 2 |
| 120 kHz | 1 |

For another example, m is 32. A correspondence between the sidelink round trip time and the SCS may be shown in Table 11b.

TABLE 11b

| SCS | Sidelink round trip time (ms) |
| --- | --- |
| 15 kHz | 32 |
| 30 kHz | 16 |
| 60 kHz | 8 |
| 120 kHz | 4 |

Alternatively, the sidelink round trip time is an average value of a third value and a fourth value. The third value is m times a maximum value (that is, 31 slots) of a HARQ round trip time, and the fourth value is m times a minimum value (that is, 1 slot) of the HARQ round trip time.

For example, m is 6. A correspondence between the sidelink round trip time and the SCS may be shown in Table 12a.

TABLE 12a

| SCS | Sidelink round trip time (ms) |
| --- | --- |
| 15 kHz | 96 |
| 30 kHz | 48 |
| 60 kHz | 24 |
| 120 kHz | 12 |

For another example, m is 32. A correspondence between the sidelink round trip time and the SCS may be shown in Table 12b.

TABLE 12b

| SCS | Sidelink round trip time (ms) |
| --- | --- |
| 15 kHz | 512 |
| 30 kHz | 256 |
| 60 kHz | 128 |
| 120 kHz | 64 |

In some embodiments, the terminal device may further determine, based on the sidelink data rate, whether to process the PSSCH. For a specific process, refer to related description of Embodiment 2 in which the terminal device determines, based on the sidelink data rate, whether to process the PSSCH. Details are not described herein.

In this embodiment of this application, the terminal device may calculate the buffer size based on the maximum value in the sidelink transmit data rate and the sidelink receive data rate. Because the sidelink transmit data rate may be different from the sidelink receive data rate, a larger value is selected to determine the buffer size, so that the buffer size can be more accurately calculated. In this way, the determined buffer size can meet a sidelink communication requirement of the terminal device, thereby improving communication quality of the sidelink communication.

Figure 6A:
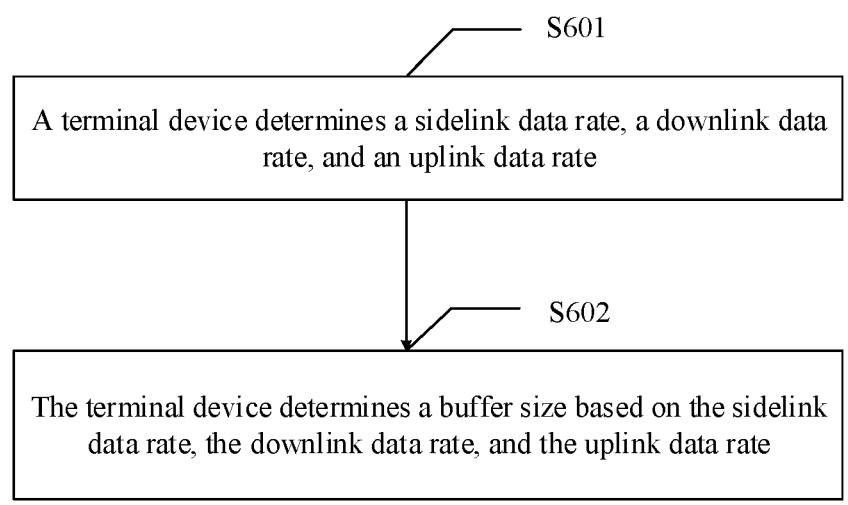
FIG. 6A is a schematic flowchart of another buffer determining method according to an embodiment of this application.

Embodiment 2: FIG. 6A is a flowchart of another buffer determining method according to this application. For a frequency band/a frequency band combination, especially an SL and Uu frequency band combination, the terminal device may determine a buffer size by using a method provided in Embodiment 2. The method includes:

S601: The terminal device determines a sidelink data rate, a downlink data rate, and an uplink data rate.

For details of the sidelink data rate, refer to the related description of the sidelink data rate in Embodiment 1. Details are not described herein again.

The downlink data rate may be a maximum volume of uplink data sent by the terminal device in a unit time. For example, the uplink data rate may be a maximum quantity of uplink bits sent by the terminal device in 1 ms. The downlink data rate may be a maximum volume of downlink data received by the terminal device in a unit time. For example, the downlink data rate may be a maximum quantity of downlink bits received by the terminal device in 1 ms.

In an example description, the uplink data rate and the downlink data rate may meet the following formula. Alternatively, it may be understood as determining the uplink data rate and the downlink data rate by using the following formula:

$$datarate = 10^{-6} \times \sum_{j=1}^{J} \left( v_{Layers}^{(j)} \times Q_m^{(j)} \times f^{(j)} \times R_{max} \times \frac{N_{PRB}^{BW(j),\mu} \times 12}{T_s^{\mu}} \times (1 - OH^{(j)}) \right)$$

In the Uu communication, J is a quantity of aggregated carriers in a frequency band or a frequency band combination.

In the Uu communication, for a $j^{th}$ component carrier (component carrier, CC), $v_{Layers}^{(j)}$ may be a maximum quantity of supported layers. For a downlink, $v_{Layers}^{(j)}$ may be indicated by an upper-layer parameter maxNumberMIMO-LayersPDSCH. For an uplink, $v_{Layers}^{(j)}$ may be indicated by upper-layer parameters maxNumberMIMO-LayersCB-PUSCH and maxNumberMIMO-LayersNonCB-PUSCH.

For the Uu communication, $Q_m^{(j)}$ is a maximum modulation order number supported by the terminal device. For a downlink, $Q_m^{(j)}$ may be indicated by an upper-layer parameter supportedModulationOrderDL. For an uplink, $Q_m^{(j)}$ may be indicated by an upper-layer parameter supportedModulationOrderUL.

For details of f(j), $R_{max}$, $\mu$, $T_s^{\mu}$, and $N_{PRB}^{BW,\mu}$ in the Uu communication, refer to the related description of f, $R_{max}$, $\mu$, $T_s^{\mu}$, and $N_{PRB}^{BW,\mu}$ in Embodiment 1. Details are not described herein again.

Herein, OH is an overhead. For the Uu communication, there may be a correspondence between OH and a frequency range. For example, if a downlink frequency range is FR1, OH may be 0.14. If a downlink frequency range is FR2, OH may be 0.18. If an uplink frequency range is FR1, OH may be 0.08. If an uplink frequency range is FR2, OH may be 0.10.

S602: The terminal device determines a buffer size based on the sidelink data rate, the downlink data rate, and the uplink data rate.

In an implementation, the terminal device may determine the buffer size based on the sidelink transmit data rate, the sidelink receive data rate, the downlink data rate, the uplink data rate, the sidelink round trip time, and the Uu round trip time. The Uu round trip time is an RLC layer round trip time in the Uu communication. For details of the sidelink round trip time, refer to the related description of the sidelink round trip time in Embodiment 1. Details are not described herein again.

In an example description, the buffer size may be determined based on a sidelink transmit buffer size, a sidelink receive buffer size, an uplink buffer size, and a downlink buffer size. For example, the buffer size may be equal to a sum of the sidelink transmit buffer size, the sidelink receive buffer size, the uplink buffer size, and the downlink buffer size. For example, the buffer size may meet the following formula. Alternatively, it may be understood as determining the buffer size by using the following formula:

Buffer Size=MaxDLDataRate×RLC RTT+MaxUL-
DataRate×RLC RTT+SLTXDataRate×SL RTT+
SLRXDataRate×SL RTT Herein, Buffer Size is the buffer size; MaxULDataRate is the uplink data rate; MaxDLDataRate is the downlink data rate; RLC RTT is the Uu round trip time; SLTXDataRate is the sidelink transmit data rate, or a maximum value in sidelink transmit data rates calculated for supported frequency bands or frequency band combinations; SLRXDataRate is the sidelink receive data rate, or a maximum value in sidelink receive data rates calculated for supported frequency bands or frequency band combinations; SL RTT is the sidelink round trip time; a product of SLTXDataRate and SL RTT is the sidelink transmit buffer size, and a product of SLRXDataRate and SL RTT is a sidelink receive buffer size.

In another example description, the buffer size may meet the following formula. Alternatively, it may be understood as determining the buffer size by using the following formula:

Buffer Size=MaxDLDataRate×RLC RTT+MaxUL-
DataRate×RLC RTT+SLTXDataRate×SL TX
RTT+SLRXDataRate×SL RX RTT Herein, Buffer Size is the buffer size; SLTXDataRate is the sidelink transmit data rate, or a maximum value in sidelink transmit data rates calculated for supported frequency bands or frequency band combinations; SLRXDataRate is the sidelink receive data rate, or a maximum value in sidelink receive data rates calculated for supported frequency bands or frequency band combinations; SL TX RTT is the sidelink transmit-side round trip time; and SL RX RTT is the sidelink receive-side round trip time.

In another example description, the buffer size may be equal to a sum of the sidelink buffer size, the uplink buffer size, and the downlink buffer size. For example, the buffer size may meet the following formula. Alternatively, it may be understood as determining the buffer size by using the following formula:

Buffer Size=MaxDLDataRate×RLC RTT+MaxUL-
DataRate×RLC RTT+SLDataRate×SL RTT

Herein, Buffer Size is the buffer size; MaxULDataRate is an uplink data rate or a maximum value in calculated uplink data rates for frequency bands or frequency band combinations; MaxDLDataRate is a downlink data rate or maximum value in calculated downlink data rates for frequency bands or frequency band combinations; RLC RTT is the Uu round trip time; SLDataRate is the sidelink transmit data rate, or a maximum value in calculated sidelink transmit data rates for supported frequency bands or frequency band combinations; SLRXDataRate is the sidelink receive data rate, or a maximum value in calculated sidelink receive data rates for supported frequency bands or frequency band combinations; and SL RTT is the sidelink transmit-side round trip time.

In some embodiments, the terminal device may further determine, based on the sidelink data rate, whether to process the PSSCH. For example, the terminal device may further determine whether the PSSCH meets a preset condition. The preset condition is related to the sidelink round trip time. If the PSSCH meets the preset condition, the terminal device processes the PSSCH. If the PSSCH does not meet the preset condition, the terminal device may not be required to process the PSSCH.

For example, the preset condition may include a first condition, or the preset condition may include a second condition, or the preset condition may include a first condition and a second condition, or the preset condition may include a condition with a higher priority in a first condition and a second condition, or the preset condition may include a condition with a lower priority in a first condition and a second condition. It should be noted that a priority of the first condition may be higher than that of the second condition, or may be lower than that of the second condition. This is not specifically limited herein.

The first condition may be as follows:

$$\frac{V_j}{L \times T_s^\mu} \le SLDataRate$$

Herein, L is a quantity of symbols allocated to the PSSCH, where an AGC symbol, an RS symbol, a GP symbol, and a PSFCH symbol are not included.

$$T_S^\mu = \frac{10^{-3}}{2^\mu \times N_{symb}^{slot}},$$

where $\mu$ is a granularity of the PSSCH, or a granularity of a corresponding frequency band/serving cell/partial bandwidth/resource pool.

For a transport block, $$V_j = C' \times \left\lceil \frac{A}{C} \right\rceil,$$

where A is a quantity of bits in the transport block, C is a total quantity of code blocks in the transport block, and C' is a quantity of scheduled code blocks in the transport block.

SLDataRate is a maximum data rate on a carrier of a frequency band of a serving cell in any frequency band or frequency band combination and a feature set. SLDataRate may be the sidelink transmit data rate, may be the sidelink receive data rate, or may be a maximum value in the sidelink transmit data rate and the sidelink receive data rate.

In an implementation, in a serving cell j, if the terminal device does not meet the first condition, the terminal device is not required to process the PSSCH.

The second condition may be as follows:

$$\frac{TBS}{L \times T_S^\mu} \le SLDataRate$$

Herein, L is a quantity of symbols allocated to the PSSCH, where an AGC symbol, an RS symbol, a GP symbol, and a PSFCH symbol are not included.

$$T_S^\mu = \frac{10^{-3}}{2^\mu \times N_{symb}^{slot}},$$

where µ is a granularity of the PSSCH, or a granularity of a corresponding frequency band/serving cell/partial bandwidth/resource pool.

TBS is a size of a transport block.

SLDataRate is a maximum data rate on a carrier of a frequency band of a serving cell in any frequency band or frequency band combination and a feature set. SLDataRate may be the sidelink transmit data rate, may be the sidelink receive data rate, or may be a maximum value in the sidelink transmit data rate and the sidelink receive data rate.

In an implementation, on a sidelink carrier, if the terminal device does not meet the second condition, the terminal device is not required to process the PSSCH.

In this embodiment of this application, for an SL and Uu frequency band combination, the terminal device may determine the buffer size based on the sidelink data rate, the uplink data rate, and the downlink data rate, to implement calculation of a layer 2 buffer of UE in V2X sidelink communication and NR sidelink communication.

It should be noted that Embodiment 1 and Embodiment 2 may be separately implemented as independent solutions, or may be combined and implemented as one solution.

Embodiment 3: an embodiment of this application provides a reference signal sending method. The method includes: A terminal device determines N resource blocks RBs on symbols. Herein, N is an odd number. A reference signal DMRS of a control channel is mapped on N−1 RBs by using an orthogonal code with a length of 2. A DMRS of a control channel or a DMRS of a data channel is mapped on the remaining RB in the following manner: mapping the DMRS of the control channel by using an orthogonal code with a length of 2, mapping the DMRS of the control channel by using an orthogonal code with a length of 3, or mapping the DMRS of the data channel. The terminal device sends the DMRS on the symbols.

Optionally, mapping the reference signal DMRS of the control channel on the N−1 RBs includes: mapping the reference signal DMRS of the control channel on a first RB to an (N−1)$^{th}$ RB; or mapping the reference signal DMRS of the control channel on a second RB to an N$^{th}$ RB.

For example, each of the N−1 RBs on which the DMRS of the control channel is mapped has three resource elements REs used to carry the DMRS of the control channel.

For example, each two adjacent RBs of the N−1 RBs on which the DMRS of the control channel is mapped have six REs used to carry the DMRS of the control channel. The six REs are generated based on three orthogonal codes with a length of 2.

For example, the orthogonal cover code with the length of 2 has two sequence values: 1 and 1, or 1 and −1.

A quantity of resource blocks (Resource Block, RB) of a candidate PSCCH is configured for each resource pool. The quantity belongs to a set {10, 12, 15, 20, 25}. Each RB includes 12 REs. When a length of a frequency-domain orthogonal cover code (Orthogonal Cover Codes, OCC) of the PSCCH is 2, the orthogonal cover code has two sequence values: 1 and 1, or 1 and −1. According to a PSCCH DMRS frequency domain mapping rule, three REs in one RB are used to map the PSCCH DMRS. Mapping the PSCCH DMRS may also be described as carrying the PSCCH DMRS. When a quantity of candidate RBs of the PSCCH is an odd number, a corresponding quantity of REs used to map the PSCCH DMRS is an odd number.

When a quantity of candidate RBs of one PSCCH is an odd number, for example, the quantity of candidate RBs of the PSCCH is 15, and three REs in one RB are used to map the DMRS, a quantity of REs that can be used to map the PSCCH DMRS in one symbol is 45 that is an odd number. Because there are three RE locations in one RB for mapping the DMRS, two values of one OCC sequence are respectively located in two adjacent RBs. In this case, an OCC sequence in one RB cannot be fully mapped. When the OCC is equal to 2, the three REs can only be mapped as +1, +1, and +1. There is no other sequence value matching a sequence value of the third RE. In this case, orthogonality of the OCC cannot be ensured, and interference of different users is reduced.

For example, when a quantity of RBs on a symbol is an odd number N, the PSCCH DMRS is mapped on N−1 RBs by using an orthogonal code with a length of 2, and the PSCCH DMRS is mapped on the remaining RB by using an orthogonal code with a length of 2.

For example, when a quantity of RBs on a symbol is an odd number N, the PSCCH DMRS is mapped on N−1 RBs by using an orthogonal code with a length of 2, and the PSCCH DMRS is mapped on the remaining RB by using an orthogonal code with a length of 3. In this way, a problem that orthogonality cannot be ensured due to an occurrence of unmatched orthogonal codes is resolved, to avoid a problem of transmission interference between users.

For example, when a quantity of RBs on a symbol is an odd number N, the PSCCH DMRS is mapped on N−1 RBs by using an orthogonal code with a length of 2, and the PSSCH DMRS is mapped on the remaining RB. Two values of one orthogonal code may appear in pairs, to ensure orthogonality of the orthogonal code.

For example, when a quantity of RBs on a symbol is an odd number N, the PSCCH DMRS is mapped on N−1 RBs by using an orthogonal code with a length of 2, and the PSCCH DMRS is mapped on the remaining RB. There are three REs on the remaining RB used for mapping the PSCCH DMRS. The last RE of the three REs is not used to map the PSCCH DMRS; or is used to map the PSSCH DMRS; or is used to map the PSCCH; or is not used to transmit any channel or signal.

For example, when a quantity of candidate RBs of the PSCCH is an odd number, the terminal device does not perform DMRS mapping at one RE location of one RB. Alternatively, the location is used to map the PSCCH, or the location is used to map the PSSCH, or the RB is used to map the PSSCH. The RB may be an RB with a smallest index in the candidate RBs of the PSCCH, or an RB with a largest index in the candidate RBs of the PSCCH, or any RB in the candidate RBs of the PSCCH, or the last RB when the DMRS is mapped on the candidate RBs of the PSCCH. The RE location may be any RE location in the RB, a last RE location in the RB, or a first RE location in the RB.

For example, when a quantity of REs that can be used to map the PSCCH DMRS in one symbol is an odd number, one of locations of the REs that can be used to map the PSCCH DMRS is not used. The location corresponds to one of the REs. Puncturing may be performed at the location. Alternatively, the location is skipped to further map the PSCCH DMRS. Alternatively, the location is used to map the PSCCH or the PSSCH. Because a quantity of REs is an odd number, when a quantity of frequency domain OCCs of the PSCCH DMRS is 2, an orthogonal effect of the orthogonal cover code cannot be ensured, and effect of channel estimation becomes poor. An advantage of this method is that it is unnecessary to use the RE corresponding to the location, and the location can be saved for other use. The other use herein includes mapping the PSCCH or the PSSCH DMRS.

Description is provided by using an example in which a quantity of RBs of the PSCCH is three. FIG. 6B is a scenario in which OCC=[1, 1], and FIG. 6C is a scenario in which OCC=[1, −1]. A quantity of REs used to carry the PSCCH DMRS in one RB is 3. It can be learned that OCCs used by an RB 1 and an RB 2 are equal to 2. As shown in FIG. 6B, an RE location 12 of the RB 1 and an RE location 4 of the RB 2 are two sequences [1, 1] of one OCC. Because a quantity of RBs is an odd number, it can be learned that RE locations 4 and 8 of the RB 1 are two sequence values of one OCC, the RE location 12 of the RB 1 and the RE location 4 of the RB 2 are two sequence values of one OCC, an RE location 8 of the RB 2 and an RE location 12 of the RB 2 are two sequence values of one OCC, and RE locations 4 and 8 of an RB 3 are two sequence values of one OCC. An RE location 12 of the RB 3 does not have the other paired sequence value of the OCC. This affects interference degrees of different users in the same resource transmission, and increases the interference degrees, because orthogonality of the OCC cannot be ensured.

For example, one RE in the RB 3 may not be used to map the DMRS. For example, the RE location 12 of the RB 3 is not used to map the DMRS. The location may be used to map the PSCCH or the PSSCH DMRS. For example, the RB 3 may be used to map the PSSCH DMRS, and is not used to map the PSCCH DMRS.

For example, the RB 1 and the RB 2 are used to map the PSCCH DMRS, and use an orthogonal code with a length of 2; and the RB 3 is not used to map the PSCCH DMRS, or the RB 3 is used to map the PSSCH DMRS.

For example, the RB 1 and the RB 2 are used to map the PSCCH DMRS, and use an orthogonal code with a length of 2. The RB 3 is used to map the PSCCH DMRS, and use an orthogonal code with a length of 2. The RE location 12 is not used to map the PSCCH DMRS, or is used to map the PSSCH DMRS. Alternatively, the RE locations 4, 8, and 12 of the RB 3 are used to map the PSCCH (including a first-level SCI and a second-level SCI). Alternatively, the PSCCH DMRS is mapped on the RB 3 by using an orthogonal code with a length of 3. Alternatively, the RB 3 is used to map the PSSCH DMRS. Alternatively, the RB 3 is used to map the PSSCH.

Figure 7:
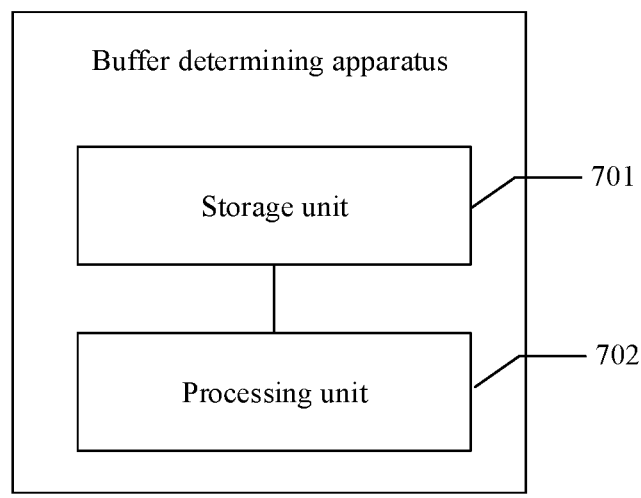
FIG. 7 is a schematic diagram of a structure of a buffer determining apparatus according to an embodiment of this application.

Based on the same invention concept as the method embodiment, an embodiment of this application provides a buffer determining apparatus. A structure of the apparatus may be shown in FIG. 7, including a storage unit 701 and a processing unit 702.

In a specific implementation, the apparatus may be specifically configured to implement the method performed by the terminal device in embodiments described in FIG. 2 to FIG. 5. The apparatus may be the terminal device, or may be a chip, a chip group, or a part of a chip for performing related functions in the method in the terminal device. The storage unit is configured to store code instructions. The processing unit 702 is configured to: determine a sidelink data rate, and determine a buffer size based on the sidelink data rate.

Optionally, when determining the buffer size based on the sidelink data rate, the processing unit 702 is specifically configured to determine the buffer size based on the sidelink data rate and a sidelink round trip time.

For example, the sidelink data rate includes a sidelink transmit data rate and/or a sidelink receive data rate.

For example, the sidelink data rate is a maximum value in the sidelink transmit data rate and the sidelink receive data rate.

For example, the sidelink transmit data rate is determined based on a quantity of transmit layers, a transmit modulation order number, and an overhead. The quantity of transmit layers is a maximum quantity of sidelink transmit layers supported by the terminal device. The transmit modulation order number is a maximum modulation order number supported by the terminal device for sidelink transmission. The overhead is a parameter value greater than 0 and not greater than 1.

For example, the sidelink transmit data rate meets the following formula:

$$SLTXDataRate = 10^{-6} \times \left( v_{Layers} \times Q_m \times f \times R_{max} \times \frac{N_{PRB}^{BW,\mu} \times 12}{T_S^{\mu}} \times (1 - OH) \right)$$

Herein, SLTXDataRate is the sidelink transmit data rate, $v_{Layers}$ is the quantity of transmit layers, $Q_m$ is the transmit modulation order number, f is an adjustment factor, $R_{max}$ is a maximum target bit rate, $T_s^{\mu}$ is an average symbol length in a slot, $N_{PRB}^{BW,\mu}$ is a maximum quantity of allocated resource blocks in a bandwidth, and OH is the overhead.

For example, the sidelink receive data rate is determined based on a quantity of receive layers, a receive modulation order number, and an overhead. The quantity of receive layers is a maximum quantity of sidelink receive layers supported by the terminal device. The receive modulation order number is a maximum modulation order number supported by the terminal device for sidelink reception. The overhead is a parameter value greater than 0 and not greater than 1.

For example, the sidelink receive data rate meets the following formula:

$$SLRXDataRate = 10^{-6} \times \left( v_{Layers} \times Q_m \times f \times R_{max} \times \frac{N_{PRB}^{BW,\mu} \times 12}{T_S^{\mu}} \times (1 - OH) \right)$$

Herein, SLRXDataRate is the sidelink receive data rate, $v_{Layers}$ is the quantity of receive layers, $Q_m$ is the receive modulation order number, f is an adjustment factor, $R_{max}$ is a maximum target bit rate, $T_s^{\mu}$ is an average symbol length in a slot, $N_{PRB}^{BW,\mu}$ is a maximum quantity of allocated resource blocks in a bandwidth, and OH is the overhead.

For example, the overhead has at least one of the following correspondences:

a correspondence between the overhead and a physical sidelink feedback channel PSFCH resource period;

a correspondence between the overhead and a cyclic prefix CP type; and a correspondence between the overhead and a frequency range.

For example, the buffer size meets the following formula:

Buffer Size=SLTXDataRate×SL RTT+SLRXDataRate×SL RTT

Herein, Buffer Size is the buffer size, SLTXDataRate is the sidelink transmit data rate, SLRXDataRate is the sidelink receive data rate, and SL RTT is the sidelink round trip time.

For example, the buffer size meets the following formula:

Buffer Size=SLDataRate×SL RTT

Herein, Buffer Size is the buffer size; SLDataRate is the maximum value in the sidelink transmit data rate and the sidelink receive data rate, or SLDataRate is the sidelink receive data rate, or SLDataRate is the sidelink transmit data rate; and SL RTT is the sidelink round trip time.

For example, there is a correspondence between the sidelink round trip time and subcarrier spacing of a sidelink frequency band.

For example, the sidelink round trip time is determined based on a first list. The first list includes a round trip time corresponding to subcarrier spacing of at least one sidelink frequency band.

For example, the sidelink round trip time is a sum of a maximum value of a HARQ round trip time and a time length of RLC polling; or the sidelink round trip time is a sum of a minimum value of a HARQ round trip time and a time length of RLC polling; or the sidelink round trip time is an average value of a first value and a second value, where the first value is a sum of a time length of RLC polling and a maximum value of a HARQ round trip time, and the second value is a sum of the time length of the RLC polling and a minimum value of the HARQ round trip time.

Optionally, the processing unit 702 may be further configured to determine a downlink data rate and an uplink data rate. When determining the buffer size based on the sidelink data rate, the processing unit 702 may be specifically configured to determine the buffer size based on the sidelink data rate, the downlink data rate, and the uplink data rate.

In some embodiments, when determining the buffer size based on the sidelink data rate, the downlink data rate, and the uplink data rate, the processing unit 702 may be specifically configured to determine the buffer size based on the sidelink data rate, the downlink data rate, the uplink data rate, a sidelink round trip time, and a Uu round trip time. The Uu round trip time is an RLC layer round trip time in Uu communication.

For example, the buffer size meets the following formula:

Buffer Size=MaxDLDataRate×RLC RTT+MaxUL-
    DataRate×RLC RTT+SLTXDataRate×SL RTT+
    SLRXDataRate×SL RTT Herein, Buffer Size is the buffer size; MaxULDataRate is the uplink data rate, MaxDLDataRate is the downlink data rate, RLC RTT is the Uu round trip time, SLTXDataRate is the sidelink transmit data rate, SLRXDataRate is the sidelink receive data rate, and SL RTT is the sidelink round trip time.

For example, the buffer size meets the following formula:

Buffer Size=MaxDLDataRate×RLC RTT+MaxUL-
    DataRate×RLC RTT+SLDataRate×SL RTT

Herein, Buffer Size is the buffer size; MaxULDataRate is the uplink data rate; MaxDLDataRate is the downlink data rate; RLC RTT is the Uu round trip time; SLDataRate is the maximum value in the sidelink transmit data rate and the sidelink receive data rate, SLDataRate is the sidelink receive data rate, or SLDataRate is the sidelink transmit data rate; and SL RTT is the sidelink round trip time.

In some embodiments, the processing unit 702 may be further configured to: determine whether the sidelink data rate meets a preset condition, and process a physical sidelink shared channel PSSCH when the sidelink data rate meets the preset condition.

For example, the preset condition may include at least one of a first condition and a second condition, or the preset condition may include a condition with a higher priority in a first condition and a second condition, or the preset condition may include a condition with a lower priority in a first condition and a second condition. The first condition is as follows:

$$\frac{V_j}{L \times T_S^\mu} \leq SLDataRate$$

Herein, L is a quantity of symbols included in the PSSCH, $$T_S^\mu = \frac{10^{-3}}{2^\mu \times N_{symb}^{slot}},$$

μ is a granularity of the PSSCH, $$V_j = C' \times \left\lceil \frac{A}{C} \right\rceil,$$

A is a quantity of bits in a transport block, C is a total quantity of code blocks in the transport block, C' is a quantity of scheduled code blocks in the transport block, and SLDataRate is the sidelink data rate. SLDataRate may be the sidelink transmit data rate, may be the sidelink receive data rate, or may be a maximum value in the sidelink transmit data rate and the sidelink receive data rate.

The second condition is as follows:

$$\frac{TBS}{L \times T_S^\mu} \leq SLDataRate$$

Herein, L is a quantity of symbols included in the PSSCH, $$T_S^\mu = \frac{10^{-3}}{2^\mu \times N_{symb}^{slot}},$$

μ is a granularity of the PSSCH, TBS is a size of the transport block, and SLDataRate is the sidelink data rate. SLDataRate may be the sidelink transmit data rate, may be the sidelink receive data rate, or may be a maximum value in the sidelink transmit data rate and the sidelink receive data rate.

In another specific implementation, the apparatus may be specifically configured to implement the method performed by the terminal device in the embodiment described in FIG. 6A. The apparatus may be the terminal device, or may be a chip, a chip group, or a part of a chip for performing related functions in the method in the terminal device. The storage unit 701 is configured to store code instructions. The processing unit 702 is configured to: determine the sidelink data rate, the downlink data rate, and the uplink data rate, and determine the buffer size based on the sidelink data rate, the downlink data rate, and the uplink data rate.

Optionally, when determining the buffer size based on the sidelink data rate, the downlink data rate, and the uplink data rate, the processing unit 702 may be specifically configured to determine the buffer size based on the sidelink data rate, the downlink data rate, the uplink data rate, a sidelink round trip time, and a Uu round trip time of a common user. The Uu round trip time is an RLC layer round trip time in Uu communication.

For example, the sidelink data rate includes the sidelink transmit data rate and/or the sidelink receive data rate.

For example, the sidelink data rate is a maximum value in the sidelink transmit data rate and the sidelink receive data rate.

For example, the sidelink transmit data rate is determined based on a quantity of transmit layers, a transmit modulation order number, and an overhead. The quantity of transmit layers is a maximum quantity of sidelink transmit layers supported by the terminal device. The transmit modulation order number is a maximum modulation order number supported by the terminal device for sidelink transmission. The overhead is a parameter value greater than 0 and not greater than 1.

For example, the sidelink transmit data rate meets the following formula:

$$SLTXDataRate = 10^{-6} \times \left( v_{Layers} \times Q_m \times f \times R_{max} \times \frac{N_{PRB}^{BW,\mu} \times 12}{T_s^{\mu}} \times (1 - OH) \right)$$

Herein, SLTXDataRate is the sidelink transmit data rate, $v_{Layers}$ is the quantity of transmit layers, $Q_m$ is the transmit modulation order number, f is an adjustment factor, $R_{max}$ is a maximum target bit rate, $T_s^{\mu}$ is an average symbol length in a slot, $N_{PRB}^{BW,\mu}$ is a maximum quantity of allocated resource blocks in a bandwidth, and OH is the overhead.

For example, the sidelink receive data rate is determined based on a quantity of receive layers, a receive modulation order number, and an overhead. The quantity of receive layers is a maximum quantity of sidelink receive layers supported by the terminal device. The receive modulation order number is a maximum modulation order number supported by the terminal device for sidelink reception. The overhead is a parameter value greater than 0 and not greater than 1.

For example, the sidelink receive data rate meets the following formula:

$$SLRXDataRate = 10^{-6} \times \left( v_{Layers} \times Q_m \times f \times R_{max} \times \frac{N_{PRB}^{BW,\mu} \times 12}{T_s^{\mu}} \times (1 - OH) \right)$$

Herein, SLRXDataRate is the sidelink receive data rate, $v_{Layers}$ is the quantity of receive layers, $Q_m$ is the receive modulation order number, f is an adjustment factor, $R_{max}$ is a maximum target bit rate, $T_s^{\mu}$ is an average symbol length in a slot, $N_{PRB}^{BW,\mu}$ is a maximum quantity of allocated resource blocks in a bandwidth, and OH is the overhead.

For example, the overhead has at least one of the following correspondences:

a correspondence between the overhead and a physical sidelink feedback channel PSFCH resource period;

a correspondence between the overhead and a cyclic prefix CP type; and a correspondence between the overhead and a frequency range.

For example, the buffer size meets the following formula:

Buffer Size=MaxDLDataRate×RLC RTT+MaxUL-
DataRate×RLC RTT+SLTXDataRate×SL RTT+
SLRXDataRate×SL RTT Herein, Buffer Size is the buffer size; MaxULDataRate is the uplink data rate, MaxDLDataRate is the downlink data rate, RLC RTT is the Uu round trip time, SLTXDataRate is the sidelink transmit data rate, SLRXDataRate is the sidelink receive data rate, and SL RTT is the sidelink round trip time.

For example, the buffer size meets the following formula:

Buffer Size=MaxDLDataRate×RLC RTT+MaxUL-
DataRate×RLC RTT+SLDataRate×SL RTT

Herein, Buffer Size is the buffer size; MaxULDataRate is the uplink data rate; MaxDLDataRate is the downlink data rate; RLC RTT is the Uu round trip time; SLDataRate is the maximum value in the sidelink transmit data rate and the sidelink receive data rate, SLDataRate is the sidelink receive data rate, or SLDataRate is the sidelink transmit data rate; and SL RTT is the sidelink round trip time.

For example, there is a correspondence between the sidelink round trip time and subcarrier spacing of a sidelink frequency band.

For example, the sidelink round trip time is determined based on a first list. The first list includes a round trip time corresponding to subcarrier spacing of at least one sidelink frequency band.

For example, the sidelink round trip time is a sum of a maximum value of a HARQ round trip time and a time length of RLC polling;

the sidelink round trip time is a sum of a minimum value of a HARQ round trip time and a time length of RLC polling; or the sidelink round trip time is an average value of a first value and a second value, where the first value is a sum of a time length of RLC polling and a maximum value of a HARQ round trip time, and the second value is a sum of the time length of the RLC polling and a minimum value of the HARQ round trip time.

In embodiments of this application, division into the units is an example, is merely division into logical functions, and may be other division during actual implementation. In addition, functional units in embodiments of this application may be integrated into one processor, or each of the units may exist alone physically, or two or more units may be integrated into one unit. The integrated unit may be implemented in a form of hardware, or may be implemented in a form of a software functional unit. It may be understood that for functions or implementations of the units in embodiments of this application, reference may be further made to corresponding descriptions in the method embodiments.

Figure 8:
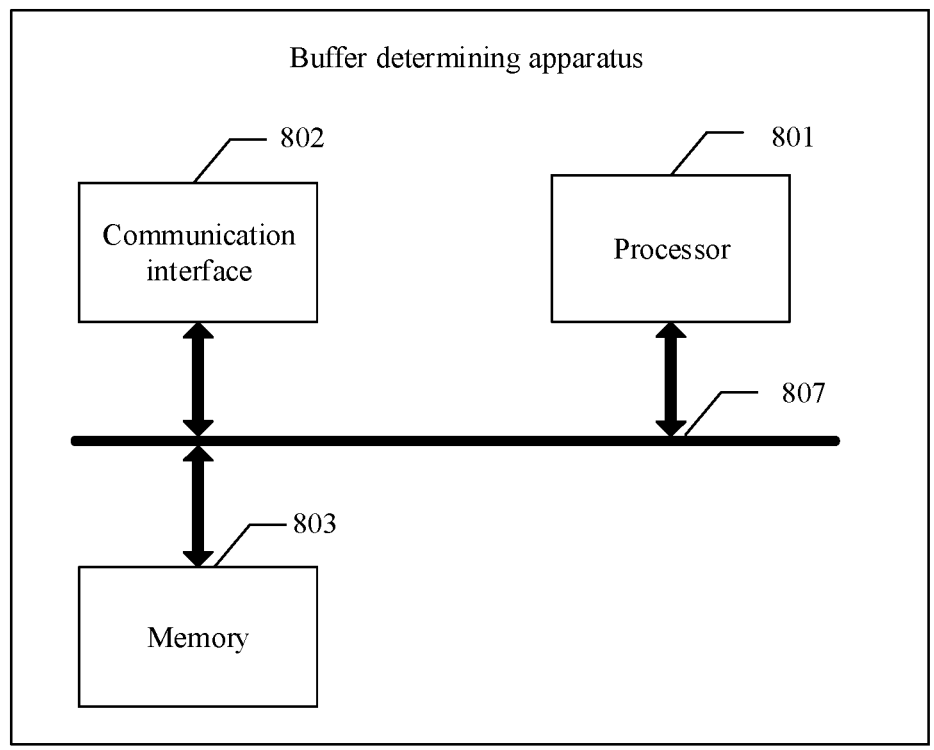
FIG. 8 is a schematic diagram of a structure of a buffer determining apparatus according to an embodiment of this application.

In a possible manner, the communication apparatus may be shown in FIG. 8. The communication apparatus may be a terminal device or a chip in a terminal device. The communication apparatus may include a processor 801, a communication interface 802, and a memory 803. The processing unit 702 may be the processor 801. The storage unit 701 may be the memory 803.

The processor 801 may be a central processing unit (central processing unit, CPU for short), a digital processing unit, or the like. The communication interface 802 may be a transceiver, may be an interface circuit such as a transceiver circuit, may be a transceiver chip, or the like. The communication apparatus further includes the memory 803 configured to store a program executed by the processor 801. The memory 803 may be a non-volatile memory such as a hard disk drive (hard disk drive, HDD) or a solid-state drive (solid-state drive, SSD), or may be a volatile memory (volatile memory) such as a random access memory (random-access memory, RAM). The memory 803 is any other medium that can carry or store expected program code in a form of an instruction or a data structure and can be accessed by a computer, but is not limited thereto.

The processor 801 is configured to execute the program code stored in the memory 803, and is specifically configured to perform operations of the processing unit 702. Details are not described herein again in this application.

In this embodiment of this application, a specific connection medium between the communication interface 802, the processor 801, and the memory 803 is not limited. In this embodiment of this application, the memory 803, the processor 801, and the communication interface 802 are connected by using a bus 807 in FIG. 8. The bus is represented by using a bold line in FIG. 8. The foregoing is merely an example for description. A connection manner of other components is not limited thereto. The bus may be classified into an address bus, a data bus, a control bus, and the like. For ease of representation, only one thick line is for representing the bus in FIG. 8, but this does not mean that there is only one bus or only one type of bus.

An embodiment of the present invention further provides a computer-readable storage medium, configured to store computer software instructions used to execute operations that need to be executed by the processor. The computer software instructions include a program used to execute the operations that need to be executed by the processor.

All or some of the foregoing embodiments may be implemented by using software, hardware, firmware, or any combination thereof. When software is used to implement embodiments, embodiments may be implemented completely or partially in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clearly that a person skilled in the art can make various modifications and variations to this application without departing from the spirit and scope of this application. This application is intended to cover these modifications and variations of this application provided that they fall within the scope of the following claims and their equivalent technologies.

What is claimed is:

1. A buffer determining method applied to a terminal device, the method comprising:
determining a sidelink data rate; and
determining a buffer size based on the sidelink data rate, wherein the sidelink data rate comprises a sidelink transmit data rate and/or a sidelink receive data rate;
determining whether a physical sidelink shared channel (PSSCH) meets a preset condition relating to a sidelink round trip time; based on the PSSCH meeting the preset condition, processing the PSSCH; based on the PSSCH not meeting the preset condition, stopping process the PSSCH; and
wherein the preset condition satisfies:

$$\frac{V_j}{L \times T_S^\mu} \leq SLDataRate$$

wherein L is a quantity of symbols allocated for the PSSCH;

$$T_S^\mu = \frac{10^{-3}}{2^\mu \times N_{symb}^{slot}};$$

μ is a granularity of the PSSCH, or a granularity of a corresponding frequency band/serving cell/partial bandwidth/resource pool; $N_{symb}^{slot}$ is a number of symbols per slot;

$$V_j = C' \times \left\lceil \frac{A}{C} \right\rceil;$$

A is a quantity of bits in a transport block; C is a total quantity of code blocks in the transport block; and C' is a quantity of scheduled code blocks in the transport block.

2. The method according to claim 1, wherein the sidelink receive data rate is determined based on a quantity of receive layers, a receive modulation order number, and an overhead,
wherein the quantity of receive layers is a maximum quantity of sidelink receive layers supported by the terminal device,
wherein the receive modulation order number is a maximum modulation order number supported by the terminal device for sidelink reception, and
wherein the overhead is a parameter value greater than 0 and not greater than 1.

3. The method according to claim 2, wherein the sidelink receive data rate meets the following:

$$SLRXDataRate = 10^{-6} \times \left( v_{Layers} \times Q_m \times f \times R_{max} \times \frac{N_{PRB}^{BW,\mu} \times 12}{T_S^\mu} \times (1 - OH) \right),$$

wherein
SLRXDataRate is the sidelink receive data rate, $v_{Layers}$ is the quantity of receive layers, $Q_m$ is the receive modulation order number, f is an adjustment factor, $R_{max}$ is a maximum target bit rate, $T_S^\mu$ is an average symbol length in a slot, $N_{PRB}^{BW,\mu}$ is a maximum quantity of allocated resource blocks in a bandwidth, and OH is the overhead.

4. The method according to claim 2, wherein the quantity of receive layers is determined based on a terminal capability, and based on the terminal device supporting layer 2 PSSCH reception, the quantity of receive layers is 2.

5. The method according to claim 2, wherein based on the terminal device having a capability of supporting 256 QAM sending, a transmit modulation order number is 8; otherwise, the transmit modulation order number is 6.

6. A buffer determining apparatus comprising:
a processor; and
a memory coupled to the processor and having processor-executable instructions stored thereon, which are executed by the processor and cause the apparatus to implement operations including:
determining a sidelink data rate; and
determining a buffer size based on the sidelink data rate, wherein the sidelink data rate comprises a sidelink transmit data rate and/or a sidelink receive data rate;
determining whether a physical sidelink shared channel (PSSCH) meets a preset condition relating to a sidelink round trip time; based on the PSSCH meeting the preset condition, processing the PSSCH; based on the PSSCH not meeting the preset condition, stopping process the PSSCH; and
wherein the preset condition satisfies:

$$\frac{V_j}{L \times T_S^\mu} \leq SLDataRate$$

wherein L is a quantity of symbols allocated for the PSSCH;

$$T_S^\mu = \frac{10^{-3}}{2^\mu \times N_{symb}^{slot}};$$

μ is a granularity of the PSSCH, or a granularity of a corresponding frequency band/serving cell/partial bandwidth/resource pool: $N_{symb}^{slot}$ is a number of symbols per slot;

$$V_j = C' \times \left\lceil \frac{A}{C} \right\rceil;$$

A is a quantity of bits in a transport block; C is a total quantity of code blocks in the transport block; and C' is a quantity of scheduled code blocks in the transport block.

7. The buffer determining apparatus according to claim 6, wherein the quantity of transmit layers is determined based on a terminal capability, and based on a terminal device supporting layer 2 physical sidelink shared channel (PSSCH) transmission, the quantity of transmit layers is 2.

8. The buffer determining apparatus according to claim 6, wherein the sidelink receive data rate is determined based on a quantity of receive layers, a receive modulation order number, and an overhead,
wherein the quantity of receive layers is a maximum quantity of sidelink receive layers supported by a terminal device,
wherein the receive modulation order number is a maximum modulation order number supported by the terminal device for sidelink reception, and
wherein the overhead is a parameter value greater than 0 and not greater than 1.

9. The buffer determining apparatus according to claim 8, wherein the sidelink receive data rate meets the following:

$$SLRXDataRate = 10^{-6} \times \left( v_{Layers} \times Q_m \times f \times R_{max} \times \frac{N_{PRB}^{BW,\mu} \times 12}{T_S^\mu} \times (1 - OH) \right),$$

wherein
SLRXDataRate is the sidelink receive data rate, $v_{Layers}$ is the quantity of receive layers, $Q_m$ is the receive modulation order number, f is an adjustment factor, $R_{max}$ is a maximum PRB target bit rate, $T_S^\mu$ is an average symbol length in a slot, $N_{PRB}^{BW,\mu}$ is a maximum quantity of allocated resource blocks in a bandwidth, and OH is the overhead.

10. The buffer determining apparatus according to claim 8, wherein the quantity of receive layers is determined based on a terminal capability, and based on the terminal device supporting layer 2 PSSCH reception, the quantity of receive layers is 2.

11. The buffer determining apparatus according to claim 8, wherein based on the terminal device having a capability of supporting 256 QAM sending, the transmit modulation order number is 8; otherwise, the transmit modulation order number is 6.

12. A non-transitory computer-readable storage medium, wherein the storage medium stores a computer program or instructions, and when the computer program or the instructions is/are executed by a communication apparatus, comprising:
determining a sidelink data rate; and
determining a buffer size based on the sidelink data rate, wherein the sidelink data rate comprises a sidelink transmit data rate and/or a sidelink receive data rate;
determining whether a physical sidelink shared channel (PSSCH) meets a preset condition relating to a sidelink round trip time; based on the PSSCH meeting the preset condition, processing the PSSCH; based on the PSSCH not meeting the preset condition, stopping process the PSSCH; and wherein the preset condition satisfies:

$$\frac{V_j}{L \times T_S^\mu} \leq SLDataRate$$

wherein L is a quantity of symbols allocated for the PSSCH;

$$T_S^\mu = \frac{10^3}{2^\mu \times N_{symb}^{slot}};$$

μ is a granularity of the PSSCH, or a granularity of a corresponding frequency band/serving cell/partial bandwidth/resource pool; $N_{symb}^{slot}$ is a number of symbols per slot;

$$V_j = C' \times \left|\frac{A}{C}\right|;$$

A is a quantity of bits in a transport block; C is a total quantity of code blocks in the transport block; and C' is a quantity of scheduled code blocks in the transport block.

13. The non-transitory computer-readable storage medium according to claim 12, wherein the sidelink receive data rate is determined based on a quantity of receive layers, a receive modulation order number, and an overhead,
wherein the quantity of receive layers is a maximum quantity of sidelink receive layers supported by a terminal device,
wherein the receive modulation order number is a maximum modulation order number supported by the terminal device for sidelink reception, and
wherein the overhead is a parameter value greater than 0 and not greater than 1.

14. The non-transitory computer-readable storage medium according to claim 12, wherein the sidelink receive data rate meets the following:

$$SLRXDataRate = 10^{-6} \times \left(v_{Layers} \times Q_m \times f \times R_{max} \times \frac{N_{PRB}^{BW,\mu} \times 12}{T_S^\mu} \times (1 - OH)\right),$$

wherein

SLRXDataRate is the sidelink receive data rate, $v_{Layers}$ is the quantity of receive layers, $Q_m$ is the receive modulation order number, f is an adjustment factor, $R_{max}$ is a maximum target bit rate, $T_S^\mu$ is an average symbol length in a slot, $N_{PRB}^{BW,\mu}$ is a maximum quantity of allocated resource blocks in a bandwidth, and OH is an overhead.

15. The non-transitory computer-readable storage medium according to claim 13, wherein the quantity of receive layers is determined based on a terminal capability, and based on the terminal device supporting layer 2 PSSCH reception, the quantity of receive layers is 2.

16. The non-transitory computer-readable storage medium according to claim 13, wherein based on the terminal device having a capability of supporting 256 QAM sending, a transmit modulation order number is 8;
otherwise, sending, the transmit modulation order number is 6.

17. The method according to claim 1, wherein the sidelink transmit data rate is determined based on a quantity of transmit layers, a transmit modulation order number, and an overhead,
wherein the quantity of transmit layers is a maximum quantity of sidelink transmit layers supported by the terminal device,
wherein the transmit modulation order number is a maximum modulation order number supported by the terminal device for sidelink transmission, and
wherein the overhead is a parameter value greater than 0 and not greater than 1.

18. The method according to claim 17, wherein the sidelink transmit data rate meets the following:

$$SLTXDataRate =$$

$$10^{-6} \times \left(v_{Layers} \times Q_m \times f \times R_{max} \times \frac{N_{PRB}^{BW,\mu} \times 12}{T_S^\mu} \times (1 - OH)\right),$$

wherein

SLTXDataRate is the sidelink transmit data rate, $v_{Layers}$ is the quantity of transmit layers, $Q_m$ is the transmit modulation order number, f is an adjustment factor, $R_{max}$ is a maximum target bit rate, $T_S^\mu$ is an average symbol length in a slot, $N_{PRB}^{BW,\mu}$ is a maximum quantity of allocated resource blocks in a bandwidth, and OH is the overhead.

19. The method according to claim 17, wherein the quantity of transmit layers is determined based on a terminal capability, and based on the terminal device supporting layer 2 (PSSCH) transmission, the quantity of transmit layers is 2.

20. The method according to claim 17, wherein based on the terminal device having a capability of supporting 256 QAM sending, the transmit modulation order number is 8; otherwise, the transmit modulation order number is 6.

* * * * *